(12) United States Patent
Baba

(10) Patent No.: US 10,962,747 B2
(45) Date of Patent: Mar. 30, 2021

(54) IMAGE PICKUP DEVICE AND IMAGE PICKUP APPARATUS

(71) Applicant: SONY SEMICONDUCTOR SOLUTIONS CORPORATION, Kanagawa (JP)

(72) Inventor: Tomohiko Baba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 239 days.

(21) Appl. No.: 15/748,688

(22) PCT Filed: Jul. 6, 2016

(86) PCT No.: PCT/JP2016/070014
§ 371 (c)(1),
(2) Date: Jan. 30, 2018

(87) PCT Pub. No.: WO2017/029901
PCT Pub. Date: Feb. 23, 2017

(65) Prior Publication Data
US 2019/0004294 A1    Jan. 3, 2019

(30) Foreign Application Priority Data
Aug. 19, 2015    (JP) .............................. JP2015-161822

(51) Int. Cl.
*G02B 3/00*    (2006.01)
*G02B 25/00*    (2006.01)
(Continued)

(52) U.S. Cl.
CPC ............. *G02B 13/18* (2013.01); *G02B 13/04* (2013.01); *G02B 9/58* (2013.01); *G02B 9/60* (2013.01)

(58) Field of Classification Search
CPC ...... G02B 7/027; G02B 25/001; G02B 13/16; G02B 21/02; G02B 13/18; G02B 9/34; G02B 13/02; G02B 9/60
(Continued)

(56) References Cited

U.S. PATENT DOCUMENTS

| 5,808,808 A | 9/1998 | Yamanashi |
| 2011/0194019 A1* | 8/2011 | Shyu .................. G02B 13/0025 348/360 |

(Continued)

FOREIGN PATENT DOCUMENTS

| CN | 201278039 Y | 7/2009 |
| CN | 104007539 A | 8/2014 |

(Continued)

OTHER PUBLICATIONS

International Search Report and Written Opinion of PCT Application No. PCT/JP2016/070014, dated Sep. 27, 2016, 10 pages.

(Continued)

*Primary Examiner* — Dawayne Pinkney
(74) *Attorney, Agent, or Firm* — Chip Law Group

(57) ABSTRACT

The maximum principal ray incident angle to an image surface is reduced in an image pickup device provided with an image pickup element. The image pickup device includes an image pickup lens, the image pickup element, and a cover glass. In the image pickup device, the cover glass is stuck on the image pickup element without containing air between them. In addition, in the image pickup device, the maximum incident angle of principal rays from the image pickup lens, to the cover glass is larger than 35 degrees. Furthermore, in the image pickup device, the refractive angle of the cover glass is at least 5 degrees smaller than the maximum incident angle.

10 Claims, 19 Drawing Sheets

(51) Int. Cl.
  *G02B 21/02*  (2006.01)
  *G02B 3/02*   (2006.01)
  *G02B 13/02*  (2006.01)
  *G02B 13/18*  (2006.01)
  *G02B 13/04*  (2006.01)
  *G02B 9/58*   (2006.01)
  *G02B 9/60*   (2006.01)

(58) Field of Classification Search
  USPC .............. 359/664, 644, 650, 659, 714–715, 359/746–747, 763–764
  See application file for complete search history.

(56) References Cited

U.S. PATENT DOCUMENTS

| | | | | |
|---|---|---|---|---|
| 2013/0208169 | A1* | 8/2013 | Hegde | H04M 1/0264 348/335 |
| 2015/0212389 | A1 | 7/2015 | Chen et al. | |

FOREIGN PATENT DOCUMENTS

| | | |
|---|---|---|
| JP | 50-096221 A | 7/1975 |
| JP | 5096221 U | 7/1975 |
| JP | 62-125312 A | 6/1987 |
| JP | 62-200313 A | 9/1987 |
| JP | 01320236 A * | 12/1989 |
| JP | 06-160705 A | 6/1994 |
| JP | 08-313804 A | 11/1996 |
| JP | 2009-216956 A | 9/2009 |
| JP | 2015-141416 A | 8/2015 |
| TW | M356114 U | 5/2009 |
| TW | 201439581 A | 10/2014 |

OTHER PUBLICATIONS

Office Action for CN Patent Application No. 201680047532.8, dated Aug. 28, 2020, 10 pages of Office Action and 13 pages of English Translation.

* cited by examiner

SPHERICAL ABERRATION (mm)

ASTIGMATISM (mm)

DISTORTION (%)

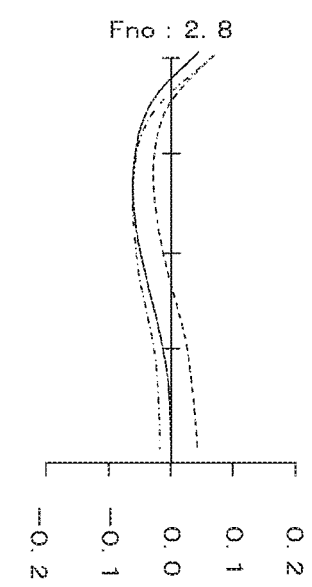
FIG. 6a SPHERICAL ABERRATION (mm)
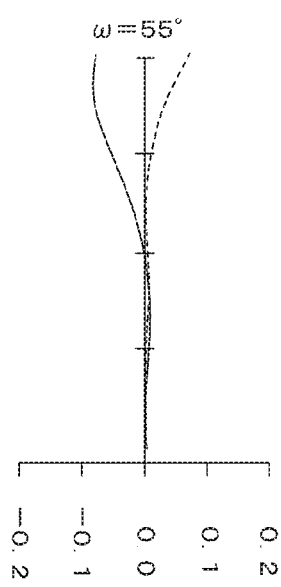
FIG. 6b ASTIGMATISM (mm)
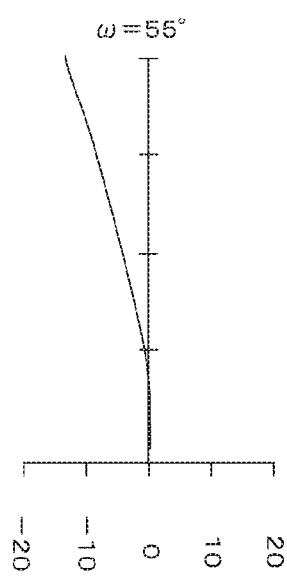
FIG. 6c DISTORTION (%)

SPHERICAL ABERRATION (mm)

ASTIGMATISM (mm)

DISTORTION (%)

SPHERICAL ABERRATION (mm)

ASTIGMATISM (mm)

DISTORTION (%)

IMAGE PICKUP DEVICE AND IMAGE PICKUP APPARATUS

CROSS REFERENCE TO RELATED APPLICATIONS

This application is a U.S. National Phase of International Patent Application No. PCT/JP2016/070014 filed on Jul. 6, 2016, which claims priority benefit of Japanese Patent Application No. JP 2015-161822 filed in the Japan Patent Office on Aug. 19, 2015. Each of the above-referenced applications is hereby incorporated herein by reference in its entirety.

TECHNICAL FIELD

The present technology relates to an image pickup device and an image pickup apparatus. More particularly, the present technology relates to an image pickup device and an image pickup apparatus which are provided with an image pickup element.

BACKGROUND ART

Conventionally, a wide-angle lens having a relatively wide field angle is used for various electronic apparatuses, such as an image pickup apparatus. For example, a wide-angle lens referred to as Super Angulon (registered trademark) of Schneider Optics Inc. is used in a film camera. In addition, a lens having a configuration resembling the wide-angle lens of Schneider Optics Inc. has been proposed, the lens having one less lens element (e.g., refer to Patent Document 1). Typically, a cover glass for protecting a film from, for example, dust is arranged between each of the wide-angle lenses and an image surface. The cover glass is arranged slightly away from the film so as not to damage the film. In addition, in each of the wide-angle lenses, a negative meniscus lens having a convex face facing the image surface side is arranged closest to the image surface side, so that the incident angle of rays to the image surface increases due to the arrangement of the meniscus lens. The rays pass through the cover glass and are incident on the image surface of the film, for example, at an incident angle of 45 degrees at a maximum.

CITATION LIST

Patent Document

Patent Document 1: Japanese Patent Application Laid-Open No. S50-096221

SUMMARY OF THE INVENTION

Problems to be Solved by the Invention

However, when the wide-angle lenses each are applied to an image pickup device mounted with an image pickup element, such as a complementary metal oxide semiconductor (CMOS), there is a risk that image quality degrades. This is because color mixture occurs between pixels when the maximum incident angle to an image surface is large in the image pickup element differently from a film. For the maximum incident angle, the allowable limit in design at which no color mixture occurs is, for example, approximately 35 degrees. Thus, there is a problem that it is difficult to apply the wide-angle lenses described above exceeding the allowable limit (35 degrees), to the image pickup device mounted with the image pickup element.

The present technology has been made in consideration of the circumstance, and an object of the present technology is to reduce a maximum principal ray incident angle to an image surface in an image pickup device provided with an image pickup element.

Solutions to Problems

The present technology has been made in order to solve the problem described above, and, according to a first aspect thereof, an image pickup device includes: an image pickup lens; an image pickup element; and a cover glass stuck on the image pickup element without containing air between them. A maximum incident angle of principal rays from the image pickup lens, to the cover glass is larger than 35 degrees, and a refractive angle of the cover glass is at least five degrees smaller than the maximum incident angle. This arrangement provides an effect of relaxing a maximum principal ray incident angle by at least five degrees due to the cover glass.

In addition, according to the first aspect, the image pickup lens may include a first lens, a second lens, a diaphragm, a third lens, and a fourth lens arranged in sequence from an object side to an image surface side, the first lens may be a spherical negative meniscus lens having a convex face facing the object side, the second lens may be an aspherical lens having positive refractive power, the third lens may be an aspherical lens having positive refractive power, the aspherical lens having convex faces on both of the object side and the image surface side, and the fourth lens may be a spherical negative meniscus lens having a convex face facing the image surface side. This arrangement provides an effect of relaxing the maximum principal ray incident angle of the image pickup lens including the first lens, the second lens, the diaphragm, the third lens, and the fourth lens arranged in sequence from the object side to the image surface side.

In addition, according to the first aspect, the image pickup lens may include a first lens, a second lens, a third lens, a diaphragm, a fourth lens, and a fifth lens arranged in sequence from an object side to an image surface side, the first lens may be a spherical negative meniscus lens having a convex face facing the object side, the second lens may be an aspherical negative meniscus lens having a convex face facing the object side, the third lens and the fourth lens each may be an aspherical lens having positive refractive power, and the fifth lens may be an aspherical negative meniscus lens having a convex face facing the image surface side. This arrangement provides an effect of relaxing the maximum principal ray incident angle of the image pickup lens including the first lens, the second lens, the third lens, the diaphragm, the fourth lens, and the fifth lens arranged in sequence from the object side to the image surface side.

In addition, according to the first aspect, the image pickup lens may include a diaphragm, a first lens, a second lens, a third lens, a fourth lens, and a fifth lens arranged in sequence from an object side to an image surface side, the first lens may be a lens having positive refractive power, the lens having a convex face facing the object side, the second lens may have negative refractive power, the third lens may have positive refractive power, the fourth lens may be a lens having positive refractive power, the lens having an aspherical face on the image surface side, the lens having the positive refractive power stronger as deviating from an optical axis, and the fifth lens may be a lens having negative refractive power, the lens having a concave face facing the object side. This arrangement provides an effect of relaxing the maximum principal ray incident angle of the image pickup lens including the diaphragm, the first lens, the second lens, the third lens, the fourth lens, and the fifth lens arranged in sequence from the object side to the image surface side.

In addition, according to the first aspect, both of the object side and the image surface side of the second lens may be concave. This arrangement provides an effect of relaxing the maximum principal ray incident angle of the image pickup lens including the second lens having the concave faces on both of the object side and the image surface side.

In addition, according to the first aspect, both of the object side and the image surface side of the third lens may be convex. This arrangement provides an effect of relaxing the maximum principal ray incident angle of the image pickup lens including the third lens having the convex faces on both of the object side and the image surface side.

In addition, according to the first aspect, a paraxial region less than a predetermined paraxial radius of curvature on each of both faces of the fourth lens, may be convex. This arrangement provides an effect of relaxing the maximum principal ray incident angle of the image pickup lens including the fourth lens in which the paraxial region less than the predetermined paraxial radius of curvature on each of both faces is convex.

In addition, according to the first aspect, an Abbe's number of the cover glass may be at least 55, and a thickness of the cover glass may be not more than 0.3 millimeters. With this arrangement, an effect of relaxing the maximum principal ray incident angle of the image pickup lens is provided in the image pickup device in which the Abbe's number of the cover glass is at least 55 and the thickness of the cover glass is not more than 0.3 millimeters.

In addition, according to the first aspect, a back focus being a distance from the cover glass to the image pickup lens, may be not more than 0.2 millimeters. With this arrangement, an effect of relaxing the maximum principal ray incident angle of the image pickup lens is provided in the image pickup device in which the back focus is not more than 0.2 millimeters.

In addition, according to the first aspect, the image pickup lens may further include a lens having substantially no lens power. This arrangement provides an effect of relaxing the maximum principal ray incident angle of the image pickup lens further including the lens having substantially no lens power.

In addition, according to a second aspect of the present technology, an image pickup apparatus includes: an image pickup device including an image pickup lens, an image pickup element, and a cover glass stuck on the image pickup element without containing air between them; and a signal processing unit configured to process an image signal generated by the image pickup element. A maximum incident angle of principal rays from the image pickup lens, to the cover glass is larger than 35 degrees, and a refractive angle of the cover glass is at least five degrees smaller than the maximum incident angle. This arrangement provides an effect of relaxing the maximum principal ray incident angle by at least five degrees due to the cover glass.

Effects of the Invention

According to the present technology, a superior effect, in which the maximum principal ray incident angle to the image surface can be reduced in the image pickup device provided with the image pickup element, can be achieved. Note that, the effects described herein are not limited, and any of the effects described in the present disclosure may be provided.

BRIEF DESCRIPTION OF DRAWINGS

FIGS. 6a, 6b, and 6c illustrate various aberration diagrams according to the comparative example.

MODE FOR CARRYING OUT THE INVENTION

Modes for carrying out the present technology (hereinafter, referred to as embodiments) will be described below. The descriptions will be given in the following order.

1. First Embodiment (an example in which a cover glass is stuck on an image pickup element)
2. Second Embodiment (an example in which an image pickup lens including four lenses in four groups is provided and a cover glass is stuck on an image pickup element)
3. Third Embodiment (an example in which a fisheye lens including five lenses in five groups and a cover glass is stuck on an image pickup element)
4. Fourth Embodiment (an example in which an image pickup lens including five lenses in five groups is provided and a cover glass is stuck on an image pickup element)
5. Fifth Embodiment (an example in which an image pickup lens including five lenses in five groups having different parameters is provided and a cover glass is stuck on an image pickup element)

1. First Embodiment

[Exemplary Configuration of Image Pickup Apparatus]

Figure 1:
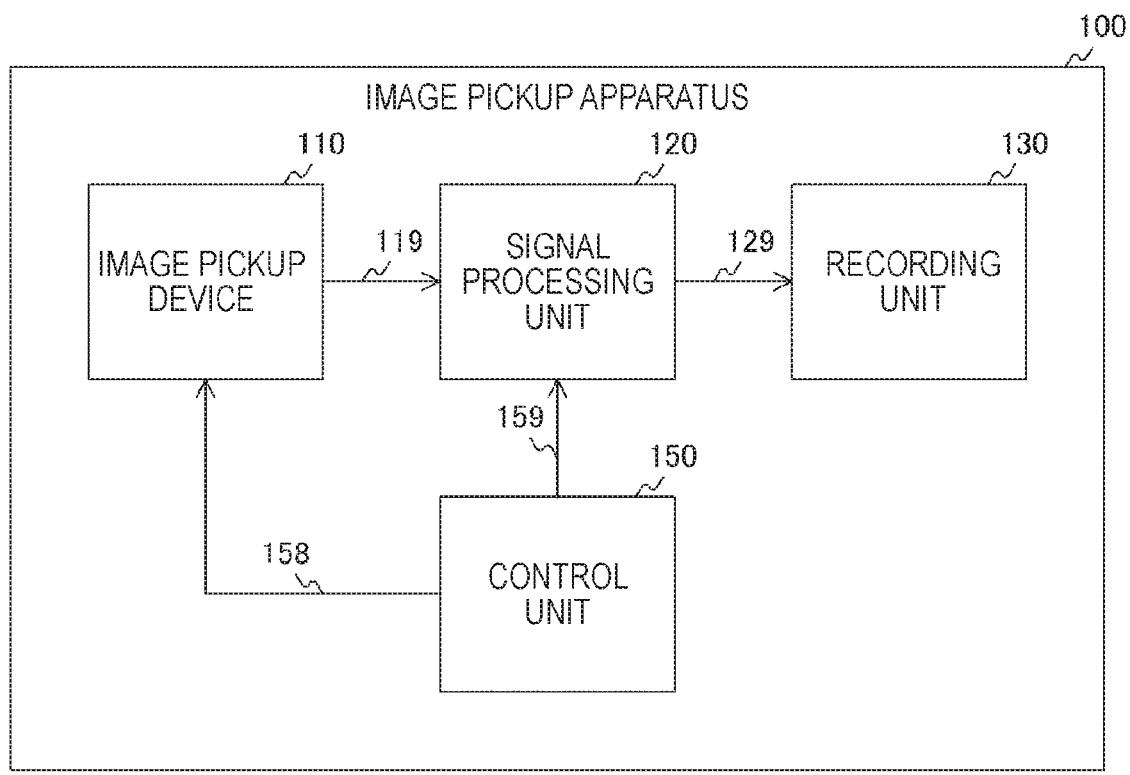
FIG. 1 is a block diagram of an exemplary configuration of an image pickup apparatus according to a first embodiment of the present technology.

FIG. 1 is a block diagram of an exemplary configuration of an image pickup apparatus 100 according to a first embodiment of the present technology. As the image pickup apparatus 100, for example, a mobile phone (a smartphone included), a mobile personal computer (PC), wearable equipment, a scanner, a surveillance camera, an action camera, a video camera, a digital camera, or the like can be assumed. The image pickup apparatus 100 includes an image pickup device 110, a signal processing unit 120, a recording unit 130, and a control unit 150.

The image pickup device 110 picks up an image in accordance with the control of the control unit 150, so as to generate an image signal. The image pickup device 110 supplies the image signal that has been generated, to the signal processing unit 120 through a signal line 119.

The signal processing unit 120 performs, as necessary, various types of signal processing, such as analog-to-digital conversion processing, noise reduction processing, and demosaic processing, to the image signal from the image pickup device 110. The signal processing unit 120 supplies the image signal to which the processing has been performed, to the recording unit 130 through a signal line 129. The recording unit 130 records the image signal.

The control unit 150 controls the entire image pickup apparatus 100. The control unit 150 controls the image pickup device 110 to pick up the image, in accordance with, for example, an operation of a user. In addition, the control unit 150 controls the signal processing unit 120 to perform signal processing in synchronization with the pickup of the image.

Note that the image pickup apparatus 100 may further include a display unit and may display the image that has been picked up, onto the display unit. In addition, the image pickup apparatus 100 may further include an interface and may transmit the image signal to an external apparatus through the interface.

[Exemplary Configuration of Image Pickup Device]

Figure 2:
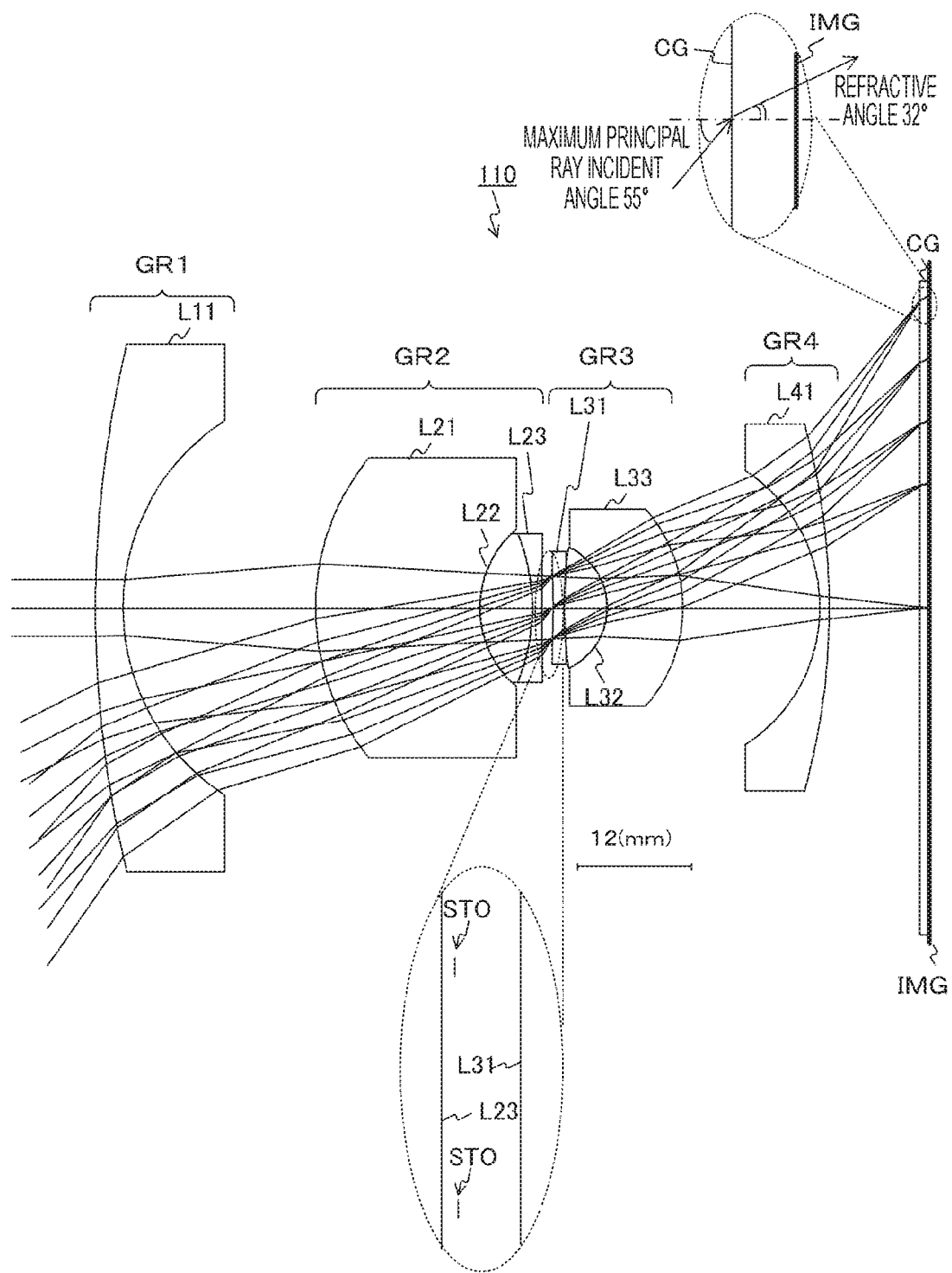
FIG. 2 is a sectional view of an exemplary configuration of an image pickup device according to the first embodiment of the present technology.

FIG. 2 is a sectional view of an exemplary configuration of the image pickup device 110 according to the first embodiment. The image pickup device 110 includes an image pickup lens, a cover glass CG, and an image pickup element IMG arranged in sequence from the object side to the image surface side. The image pickup lens includes a first lens group GR1, a second lens group GR2, a diaphragm STO, and a fourth lens group GR4 arranged in sequence from the object side to the image surface side.

The first lens group GR1 includes a lens L11. The lens L11 is a meniscus lens having negative refractive power (lens power), the meniscus lens having a convex face facing the object side. In addition, the second lens group GR2 includes a cemented lens L20 including a trio of a lens L21, a lens L22, and a lens L23 cemented (a so-called triplet lens). The third lens group GR3 also includes a triplet lens L30 including a lens 31, a lens 32, and a lens 33 cemented. The fourth lens group GR4 includes a lens L41. The lens L41 is a meniscus lens having negative refractive power, the meniscus lens having a convex face facing the image surface side.

The lens L11 and the triplet lens L20 described above are arranged in a symmetrical form, facing the lens L41 and the triplet lens L30 across the diaphragm STO. The lenses form the image pickup lens including the eight lenses in the four groups.

The arrangement of the negative first lens group GR1 closest to the object side can relax (namely, reduce) the incident angle of rays incident on the second lens group GR2. Therefore, the maximum angle of the rays incident on the first lens group GR1 (namely, the field angle) can be relatively expanded. In addition, since the negative group is at the front, a fall in peripheral light intensity becomes more gradual due to the cosine fourth law, so that the peripheral light intensity can increase.

In addition, the fourth lens group GR4 having a concave face facing the object side is arranged closest to the image surface side so that the incident angle of the rays incident on an image surface can be made acute (namely, large). With this arrangement, the image pickup device 110 can be miniaturized with the distance between the fourth lens group GR4 and the image surface, shortened.

In this manner, a small-sized wide-angle lens can be achieved with the arrangement of the negative first lens group GR1 closest to the object side and the arrangement of the fourth lens group GR4 having the concave face facing the object side, closest to the image surface side.

In addition, since the cemented lenses L20 and L30 are provided, approximate chromatic aberration or high-order aberration can be corrected. The image pickup lens, including a shape closest to the object side (the lens L11) and a shape closest to the image surface side (the lens L41) in symmetry, can reduce image surface curvature, optical aberration, such as astigmatism, coma aberration, or spherical aberration, and optical distortion, but has difficulty in correcting chromatic aberration. However, the chromatic aberration can be sufficiently corrected by the triplet lenses (the cemented lenses L20 and L30).

In addition, as condition (a), a maximum principal ray incident angle is defined larger than 35 degrees, the maximum principal ray incident angle being the maximum value when principal rays from the image pickup lens described above are incident on the cover glass CG. For example, the maximum principal ray incident angle to the cover glass CG is 55 degrees.

The cover glass CG is a transparent body for protecting the image pickup element IMG, and is stuck on the image surface of the image pickup element IMG with adhesive or filler without containing air between the cover glass CG and the image pickup element IMG. When the relative refractive index of the cover glass CG to the air is defined as $n_{CG}$, the incident angle is defined as $R_{in}$, and the refractive angle is defined as $R_{out}$, the following relation expression is satisfied due to Snell's law. Note that the refractive index of the adhesive or the filler is approximately equivalent to that of the cover glass CG.

$$\sin(R_{in})/\sin(R_{out})=n_{CG}$$

In the above expression, the refractive angle $R_{out}$ of the cover glass CG is smaller by 5 degrees or more than the incident angle $R_{in}$. Since the cover glass CG is stuck on the image surface of the image pickup element IMG as described above, the principal rays refracted at the refractive angle $R_{out}$ in the above expression are incident on the image surface at the angle retained. Thus, the principal ray maximum incident angle ($=R_{out}$) to the image surface becomes 5 degrees or more smaller than the maximum principal ray incident angle ($=R_{in}$) to the cover glass CG. That is, the maximum emergent angle ($=R_{in}$) to the optical axis of the principal rays from the image pickup element is relaxed by 5 degrees or more due to the refraction at the cover glass CG. For example, the relative refractive index $n_{CG}$ is approximately 1.5, and the maximum emergent angle is relaxed to 32 degrees with the above expression.

The image pickup element IMG photoelectrically converts light received through the image pickup lens, so as to generate an image signal. The image pickup element IMG includes, for example, a charge coupled device (CCD) or a CMOS. In the image pickup element IMG, the maximum incident angle at which no color mixture occurs between pixels is, for example, approximately 35 degrees. As described above, the maximum principal ray emergent angle is relaxed by 5 degrees or more due to the cover glass CG. Thus, even when the wide-angle image pickup lens having the maximum principal ray emergent angle to the cover glass CG, larger than 35 degrees, is used, the incident angle to the image surface can be kept to 35 degrees being the allowable limit, or less.

In addition, as condition (b), the Abbe's number of the cover glass CG is desirably 55 degrees or more. This is because, when the Abbe's number becomes smaller than 55, refractive-index dispersion due to wavelength increases and superfluous aberration is generated by a multiplier effect with the large incident angle, so that the MTF degrades.

In addition, as condition (c), the thickness of the cover glass CG is desirably 0.3 millimeters (mm) or less. This is because the distance from the image pickup lens to the cover glass CG (a back focus) can be shorten as the cover glass CG is made thinner. Particularly, for a mobile apparatus, such as a smartphone, miniaturization is prioritized over the others and thus the cover glass CG being thin is required. In addition, in accordance with a current trend in which a pixel pitch is reduced, when the pixel pitch is made 1.0 micrometer (µm) or less, a thicker cover glass CG increases the aberration to be generated, so that the MTF degrades. The limit of the cover glass CG in thickness, for causing the aberration to be an allowable value or less, is approximately 0.3 millimeters (mm).

In addition, as condition (d), the distance from the cover glass CG to the image pickup lens (the back focus) is desirably 0.2 millimeters (mm) or less. This is because, as described above, for the mobile apparatus, such as the smartphone, the miniaturization is prioritized over the others. In addition, when the pixel pitch is made 1.0 micrometer (µm) or less in accordance with the current trend, a bright (namely, large) F-number is required and a short back focus is required to increase the F-number.

The reason why a short back focus causes the F-number to be a bright value is similar to that, in an optical disc, as a numerical aperture becomes a brighter value, a cover glass decreases in thickness and the differential distance of an objective lens is shorten. There is a similar relationship in a stepper for semiconductor manufacturing, and thus the overview of the technology can be interpreted.

Note that, the image pickup device 110 may further include an optical filter, such as an infrared cutoff filter or a low-pass filter, in addition to the image pickup lens, the cover glass CG, and the image pickup element IMG. In this case, the optical filter is arranged on the object side or image surface side of the cover glass CG. In making the arrangement on the object side, the optical filter can be arranged at a position away from the cover glass CG. Meanwhile, in making the arrangement on the image surface side, the optical filter is arranged being stuck on the cover glass CG and the image pickup element IMG. In addition, the image pickup device 110 may further include an optical member, such as a lens having substantially no lens power, other than the optical filter.

Appropriately adopting the conditions can achieve a compact optical system and image pickup apparatus, having more favorable image formation performance, appropriate to the individual elements and the apparatus.

Note that the definitions or the like of symbols indicated in each table or the descriptions below are as follows: "R" represents the radius of curvature of a face. "d" corresponding to face number i, represents the on-axis face interval between an i-th face and an (i+1)-th face counted from the object side. "nd" represents the refractive index of glass or material having a face on the object side, to a d line (a wavelength of 587.6 nm). "vd" represents the Abbe's number, to the d line, of the glass or the material having the i-th face on the object side. Then, regarding the radius of curvature, "∞" represents that the face is planar.

[Components of Image Pickup Device]

Table 1 illustrates lens data of the image pickup device 110 according to the first embodiment.

TABLE 1

| Face number | Radius of curvature R (mm) | Interval d (mm) | Refractive index nd | Abbe's number vd |
|---|---|---|---|---|
| 1 | 118.60 | 3.00 | 1.79 | 38.1 |
| 2 | 28.80 | 20.78 | — | — |
| 3 | 25.35 | 17.76 | 2.00 | 21.0 |
| 4 | 11.05 | 5.64 | 1.94 | 30.7 |
| 5 | −21.01 | 1.00 | 1.84 | 24.4 |
| 6 | 149.31 | 1.09 | — | — |
| 7 | ∞ | 0.16 | — | — |
| 8 | −54.31 | 1.18 | 1.50 | 81.6 |
| 9 | 43.43 | 4.64 | 1.69 | 48.1 |
| 10 | −7.16 | 8.21 | 2.00 | 27.4 |
| 11 | −15.80 | 14.73 | — | — |
| 12 | −17.46 | 1.00 | 1.62 | 64.3 |
| 13 | −73.98 | 4.82 | — | — |
| 14 | ∞ | 1.00 | 1.52 | 64.2 |

In Table 1, face numbers 1 and 2 represent the faces on the object side and image surface side of the lens L11. Face numbers 3 and 4 represent the faces on the object side and image surface side of the lens L21. Face numbers 5 and 6 represent the faces on the object side and image surface side of the lens L23. Face number 7 represents a face of the diaphragm STO. Face numbers 8 and 9 represent the faces on the object side and image surface side of the lens L31. Face numbers 10 and 11 represent the faces on the object side and image surface side of the lens L33. Face numbers 12 and 13 represent the faces on the object side and image surface side of the lens L41. Face number 14 represents the face on the object side of the cover glass CG.

On the basis of the data exemplified in Table 1, the image pickup lens having a numerical aperture of 4.5, a half field angle of 55.0 degrees, and an entire lens length of 90 millimeters (mm) in the optical axis direction is formed.

[Aberration of Image Pickup Lens]

Figure 3A:
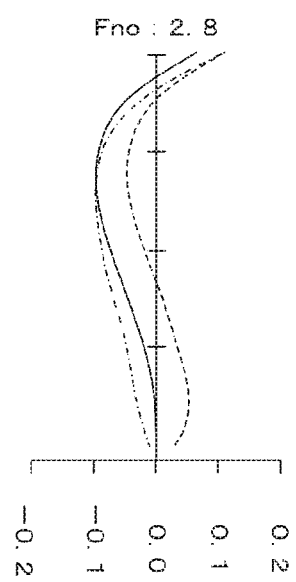
FIGS. 3a, 3b, and 3c illustrate various aberration diagrams according to the first embodiment of the present technology.
Figure 3B:
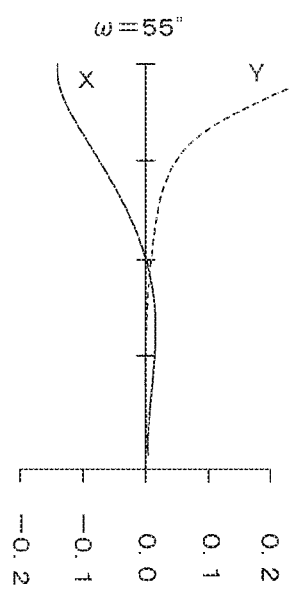
Figure 3C:
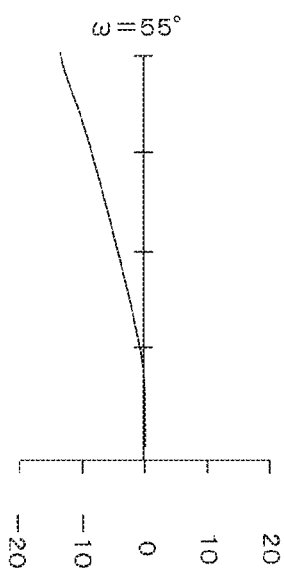

FIGS. 3a, 3b, and 3c illustrate various aberration diagrams of the image pickup lens according to the first embodiment of the present technology. In the figure, a, b, and c represent a spherical aberration diagram, an astigmatism diagram, and a distortion diagram, respectively. In the spherical aberration diagram, the dotted line represents the value with the d line (587.56 nm), the solid line represents the value with a c line (a wavelength of 546.07 nm), and the dot-and-dash line represents the value with a g line (a wavelength of 486.13 nm). In addition, in the astigmatism diagram, the solid line (X) represents the value on the sagittal image surface of the d line, and the broken line (Y) represents the value on the meridional image surface of the d line. In addition, in the distortion diagram, the solid line represents the value with the d line. In addition, in the spherical aberration diagram and the astigmatism diagram, "Fno" represents the maximum aperture (F-number) and "ω" represents the half field angle, respectively. In addition, in each of the astigmatism diagram and the distortion diagram, the vertical axis represents image height and the unit is the millimeter (mm). A similar manner applies to the following spherical aberration diagrams, astigmatism diagrams, and distortion diagrams.

Figure 4:
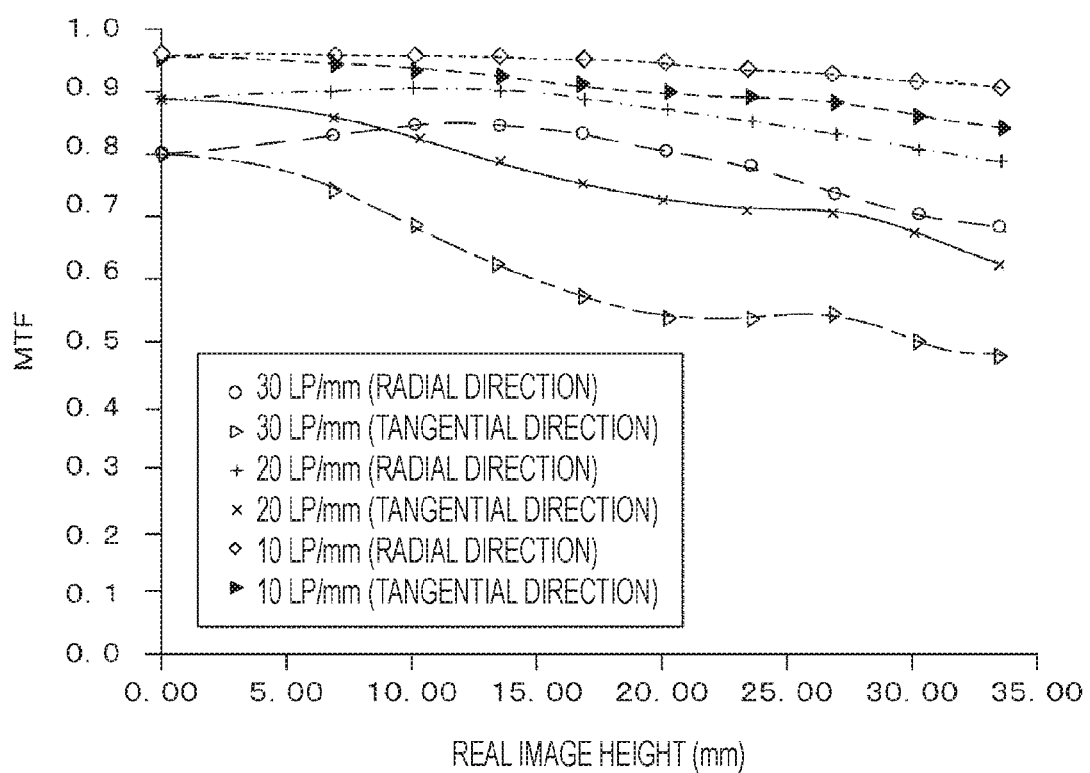
FIG. 4 is a graph illustrating exemplary modulation transfer function (MTF) curves according to the first embodiment of the present technology.

FIG. 4 is a graph illustrating exemplary MTF curves of the image pickup lens according to the first embodiment. In the figure, the vertical axis represents the MTF and the horizontal axis represents real image height. In addition, the solid lines represent the curves in the radial direction and the dotted lines represent the curves in the tangential direction. Here, the MTF is one of the indicators expressing the level of image quality, and a higher MTF indicates the blur of an image less and the image quality higher. As exemplified in the figure, the MTF of the image pickup lens has sufficiently high values.

Figure 5:
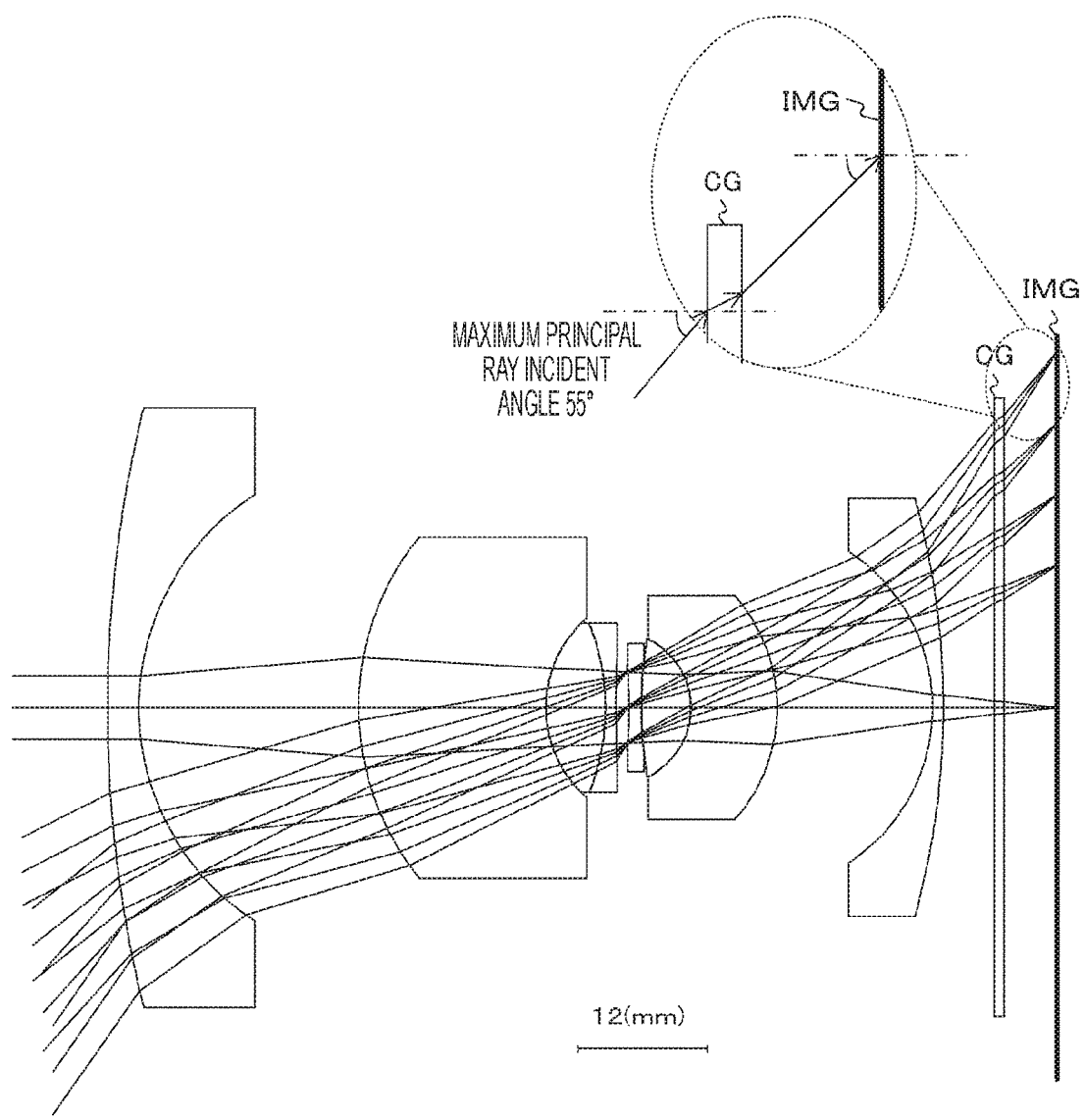
FIG. 5 is a sectional view of an exemplary configuration of an image pickup device according to a comparative example.

FIG. 5 is a sectional view of an exemplary configuration of an image pickup device according to a comparative example in which a cover glass CG is away from an image surface. The configuration of an image pickup lens according to the comparative example is similar to that of the image pickup lens according to the first embodiment. Meanwhile, the cover glass CG is arranged at a position slightly away from an image pickup element IMG. Thus, rays refracted at the face on the object side of the cover glass CG are refracted again at the face on the image surface side of the cover glass CG, so as to be incident on the image surface. With this arrangement, the maximum principal ray incident angle to the image surface is the same value (e.g., 55 degrees) as the maximum principal ray incident angle to the cover glass CG. As described above, since the allowable limit of the incident angle to the image pickup element IMG is 35 degrees, the configuration according to the comparative example has difficulty in being applied to an apparatus provided with the image pickup element IMG although the configuration can be applied to a film camera.

In contrast to this, the maximum principal ray incident angle is relaxed by 5 degrees or more due to the cover glass CG in the image pickup device 110 exemplified, for example, in FIG. 1. Thus the wide-angle image pickup lens having the maximum principal ray incident angle exceeding 35 degrees can be used in the apparatus provided with the image pickup element IMG.

Figure 7:
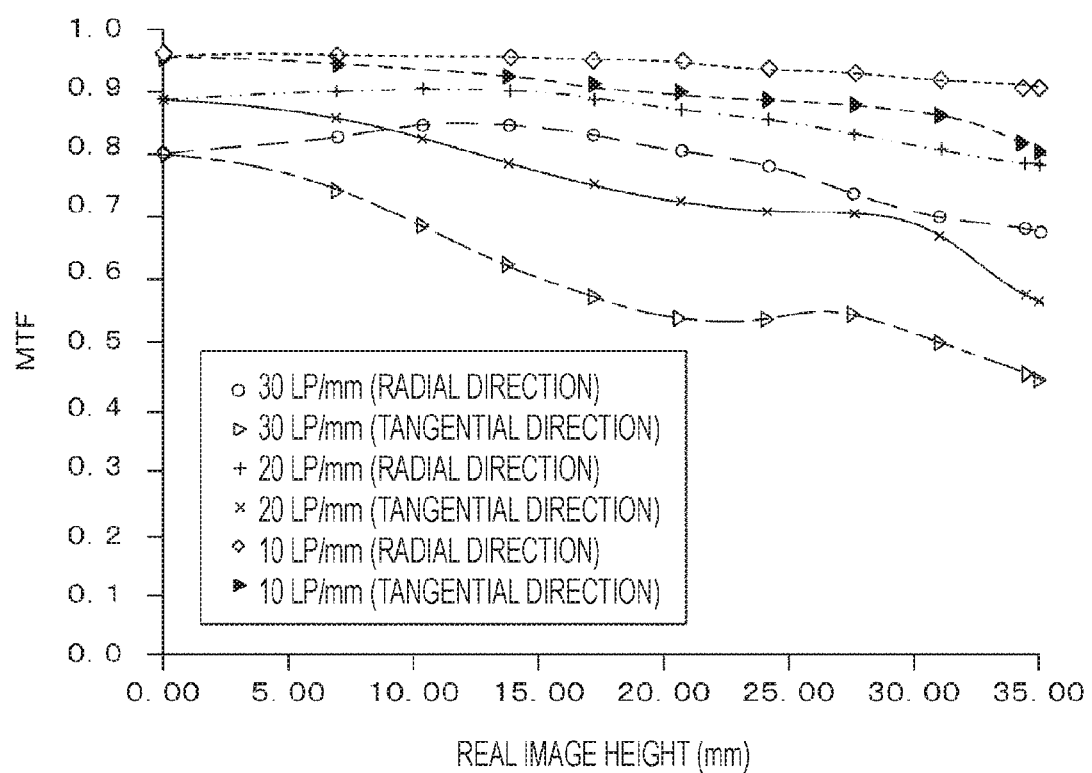
FIG. 7 is a graph illustrating exemplary MTF curves according to the comparative example.

FIGS. 6a, 6b, and 6c illustrate various aberration diagrams according to the comparative example, and FIG. 7 is a graph illustrating exemplary MTF curves according to the comparative example. In comparison between FIGS. 6a, 6b, and 6c according to the comparative example and FIGS. 3a, 3b, and 3c according to the first embodiment, longitudinal spherical aberration and aspherical aberration degrade in the aberration diagrams according to the first embodiment. However, this is because of the difference between the performance calculations performed in air and in the medium of the cover glass CG having the refractive index of 1.5, and thus there is no substantial difference in aberration between the two. The fact is obvious since there is hardly any difference in the MTF between FIG. 7 according to the comparative example and FIG. 4 according to the first embodiment.

In this manner, according to the first embodiment of the present technology, since the cover glass having the refractive angle smaller by 5 degrees or more than the incident angle is stuck on the image surface of the image pickup element, the incident angle (=the refractive angle) to the image surface of the image pickup element can be made smaller by 5 degrees or more than the incident angle to the cover glass. Thus, the wide-angle image pickup lens having the maximum incident angle to the cover glass, exceeding the allowable limit of the image pickup element (approximately 35 degrees) can be applied to the image pickup apparatus 100.

2. Second Embodiment

According to the first embodiment described above, the image pickup lens including the eight lenses in the four groups is provided, but the number of lenses can be reduced in order to perform miniaturization. An image pickup device 110 according to a second embodiment is different from that according to the first embodiment in that the number of lenses is reduced to four lenses in four groups.

Figure 8:
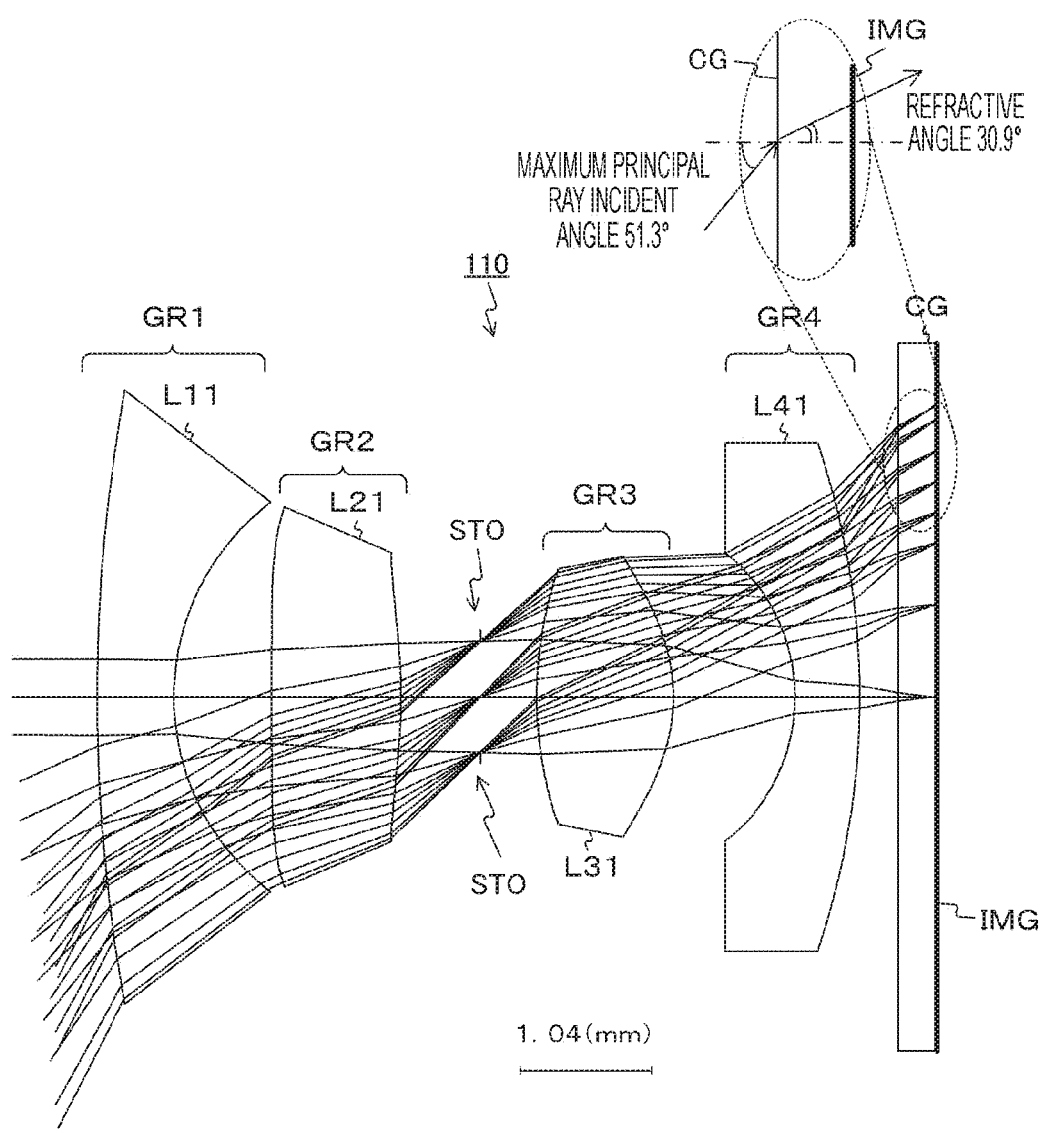
FIG. 8 is a sectional view of an exemplary configuration of an image pickup device according to a second embodiment of the present technology.

FIG. 8 is a sectional view of an exemplary configuration of the image pickup device 110 according to the second embodiment of the present technology. The image pickup device 110 according to the second embodiment is different from that according to the first embodiment in that an image pickup lens includes the four lenses in the four groups. The image pickup lens includes a first lens group GR1, a second lens group GR2, a diaphragm STO, a third lens group GR3, and a fourth lens group GR4 arranged in sequence from the object side to the image surface side.

According to the second embodiment, for example, a ¼-inch imager having a 100-percent image height of 2.25 millimeters (mm), a pixel pitch of 2.8 micrometers (μm), and a pixel count of 1.2 mega is used as an image pickup element IMG. The image pickup device 110 is, for example, used for an in-vehicle camera (mainly, a rear-view camera). According to the second embodiment, the image pickup lens is totally formed of glass for high thermal resistance and high reliability. Therefore, an attempt is made to include spherical lenses if possible.

The first lens group GR1 includes a lens L11. The lens L11 is a spherical negative meniscus lens having a convex face facing the object side. The second lens group GR2 includes an aspherical lens L21 having weak positive refractive power. The third lens group GR3 includes an aspherical lens L31 having positive refractive power, the aspherical lens L31 having convex faces on both of the object side and the image surface side. The fourth lens group GR4 includes a lens L41. The lens L41 is a spherical negative meniscus lens having a convex face facing the image surface side. Note that the lens L11 is an exemplary first lens described in the claims. In addition, the lens L21 is an exemplary second lens described in the claims, and the lens L31 is an exemplary third lens described in the claims. In addition, the lens L41 is an exemplary fourth lens described in the claims.

According to the second embodiment, a cover glass CG is also stuck on the image pickup element IMG, similarly to the first embodiment. With this arrangement, the maximum emergent angle of the image pickup lens (51.3 degrees) is relaxed to 30.9 degrees, and incidence is made on an image surface with the angle retained. As described above, since the allowable limit of the maximum incident angle to a CMOS or a CCD is approximately 35 degrees, the maximum incident angle is made not more than the allowable limit due to the relaxation so that the wide-angle image pickup lens can be applied to the image pickup device 110 including, for example, the CMOS.

In addition, as described above, in sequence from the object side, the lens L11 having strong negative refractive power and next the lens L21 having the positive refractive power are arranged and, across the diaphragm STO, the lenses L31 and L41 in a configuration in which the lenses are inverted are arranged. In this manner, with the symmetrical configuration across the diaphragm STO, asymmetrical aberration is inhibited from occurring and the incident angle to the image pickup element IMG is adjusted so that desirable image pickup characteristics can be achieved. The lens L11 having the strong negative refractive power, closest to the object side, functions, for principal rays incident on the entire lens system, to relax the incident angle acute on the periphery so as to achieve a wider field angle.

In addition, the half field angle of the image pickup lens is 63 degrees, the principal rays at the outermost field angle are incident on the image pickup lens at 63 degrees and are emergent from the image pickup lens at 51.3 degrees. A smaller difference between the incident angle and the emergent angle, indicates that the symmetry of the lens system is higher, and the higher symmetry acts on aberration correction advantageously so that advantage easily overall accrues to an image pickup apparatus 100.

In this manner, with the half field angle of 63 degrees, the incident angle of 30.9 degrees to the image pickup element, and an F-number of 2.8 being bright, the image pickup apparatus 100 having high resolution as indicated in MTF curves to be described later, can be achieved. In addition, the optical entire length is 6.5 millimeters (mm), and is excessively shorter than those of the other configurations having equivalent performance.

Typically, a ¼-inch wide-angle lens totally formed of glass, having a half field angle of 63 degrees, is achieved with totally approximately six lenses. For the lenses, lenses having strong negative refractive power are collectively arranged on the image surface side and a number of the other lenses correct, for example, image surface curvature so that the image pickup characteristics are ensured. As a result, the optical entire length increases. In contrast to this, the image pickup apparatus 100 according to the second embodiment includes the lenses less than those in the configuration, so that further miniaturization can be performed.

In addition, conditions (a) to (d) according to the first embodiment are also satisfied according to the second embodiment. A similar manner applies to third, fourth, and fifth embodiments to be described later.

In addition, some lenses in the lenses used according to the second embodiment have a lens face including an aspherical face. When the distance in the optical axis direction from the vertex of a lens face (the sag amount) is defined as "x", the height in the perpendicular direction to the optical axis is defined as "y", and the paraxial radius of curvature at the lens vertex is defined as "c", and the conic constant is defined as "κ", an aspherical face is, for example, defined by the following expression:

[Mathematical Formula 1]

$$x = \frac{cy^2}{\{1 + (1 - (1+\kappa)c^2y^2)\}^{1/2}} + Ay^4 + By^6 + Cy^8 + Dy^{10}$$

In the above expression, A, B, C, and D are fourth-order, sixth-order, eighth-order, and tenth order aspherical coefficients, respectively.

[Components of Image Pickup Device]

The following Table 2 illustrates lens data of the image pickup device 110 according to the second embodiment.

TABLE 2

| Face number | Radius of curvature R (mm) | Interval d (mm) | Refractive index nd | Abbe's number vd |
|---|---|---|---|---|
| 1 | 12.75 | 0.600 | 1.77 | 49.6 |
| 2 | 1.88 | 0.751 | — | — |
| 3 | 1000.00 | 1.006 | 1.88 | 37.2 |
| 4 | −4.19 | 0.614 | — | — |
| 5 | ∞ | 0.431 | — | — |
| 6 | 2.75 | 1.060 | 1.62 | 63.9 |
| 7 | −1.33 | 0.938 | — | — |
| 8 | −1.41 | 0.500 | 2.00 | 19.3 |
| 9 | −6.01 | 0.300 | — | — |
| 10 | ∞ | 0.300 | 1.52 | 64.2 |
| 11 | ∞ | 0.000 | 1.52 | 64.2 |

In Table 2, face numbers 1 and 2 represent the faces on the object side and image surface side of the lens L11. Face numbers 3 and 4 represent the faces on the object side and image surface side of the lens L21. Face number 5 represents a face of the diaphragm STO. Face numbers 6 and 7 represent the faces on the object side and image surface side of the lens L31. Face numbers 8 and 9 represent the faces on the object side and image surface side of the lens L41. Face number 10 and 11 represent the faces on the object side and image surface side of the cover glass CG.

The faces of face numbers 3, 4, 6, and 7 each include an aspherical face. Table 3 exemplifies aspherical face data of the faces.

TABLE 3

| Face number | Conic constant K | Aspherical coefficient A | Aspherical coefficient B | Aspherical coefficient C | Aspherical coefficient D |
|---|---|---|---|---|---|
| 3 | −1.000 | 0.165E−01 | −0.367E−02 | 0.307E−02 | −0.496E−04 |
| 4 | −0.490 | 0.558E−01 | −0.265E−01 | 0.162E−01 | 0.135E−03 |
| 6 | 0.375 | −0.572E−01 | 0.832E−01 | −0.624E−01 | 0.236E−01 |
| 7 | −0.537 | 0.334E−01 | 0.199E−01 | −0.353E−02 | 0.786E−02 |

On the basis of the data exemplified in Tables 2 and 3, the image pickup lens having a numerical aperture of 2.8, the half field angle of 63.0 degrees, and an entire lens length of 6.5 millimeters (mm) in the optical axis direction is formed.

[Aberration of Image Pickup Lens]

Figure 9A:
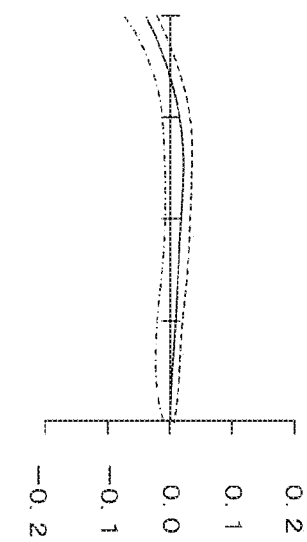
FIGS. 9a, 9b, and 9c illustrate various aberration diagrams according to the second embodiment of the present technology.
Figure 9B:
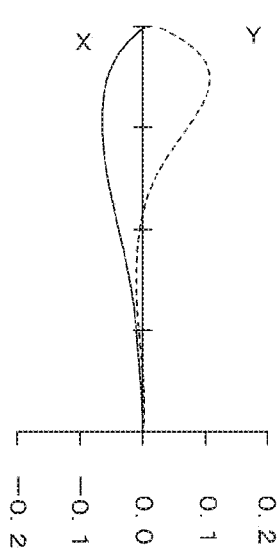
Figure 9C:
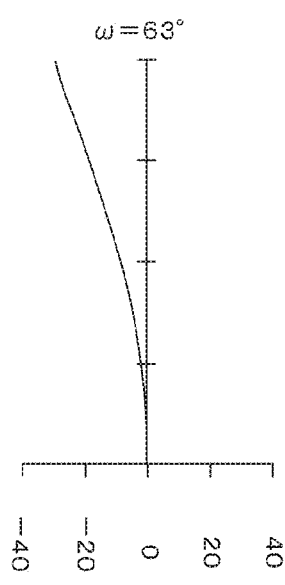
Figure 10:
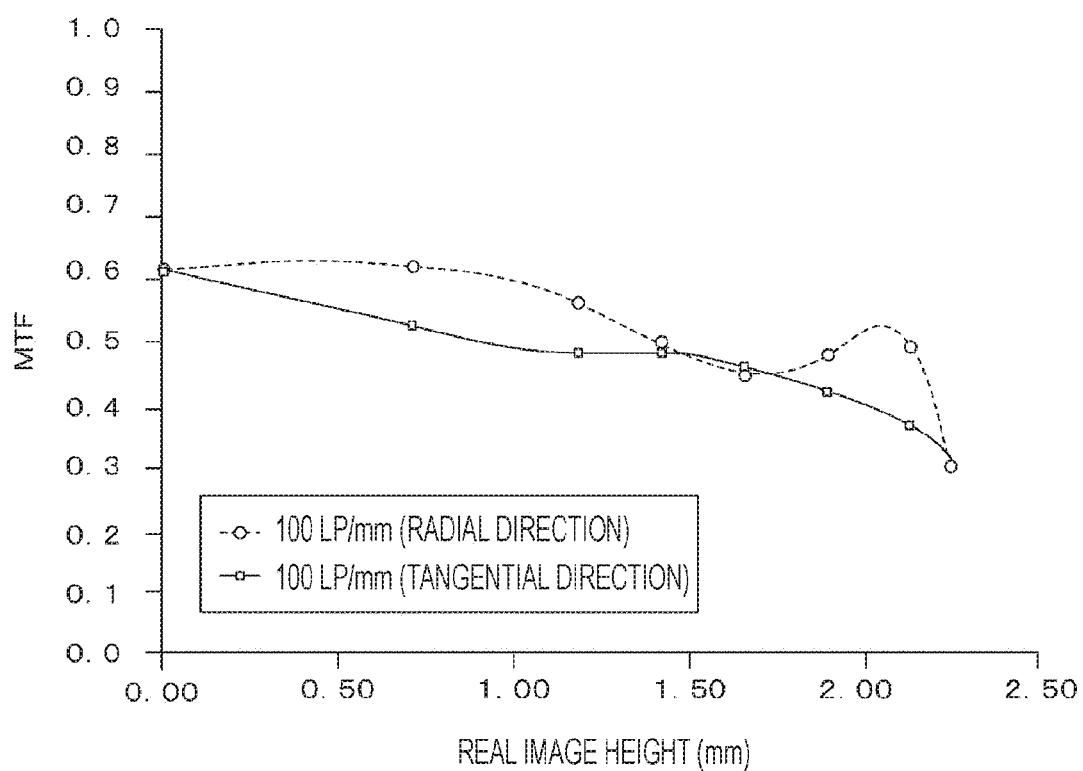
FIG. 10 is a graph illustrating exemplary MTF curves according to the second embodiment of the present technology.

FIGS. 9a, 9b, and 9c illustrate various aberration diagrams of the image pickup lens according to the second embodiment of the present technology, and FIG. 10 is a graph illustrating exemplary MTF curves according to the second embodiment. In FIG. 10, a curve including the plots of circles represents the MTF curve in the radial direction and a curve including the plots of squares represents the MTF curve in the tangential direction. As exemplified in FIG. 10, high resolution, in which the MTF characteristic is 40% or more, is acquired in each of the MTF curves in 100 line pairs (LP)/mm.

In this manner, according to the second embodiment of the present technology, the image pickup lens including the four lenses in the four groups is provided, so that the image pickup device 110 can be further reduced in size in comparison to that including the eight lenses in the four groups according to the first embodiment.

3. Third Embodiment

According to the first embodiment described above, the image pickup lens including the eight lenses in the four groups is provided, but the number of lenses can be reduced in order to perform miniaturization. An image pickup device 110 according to a third embodiment is different from that according to the first embodiment in that the number of lenses is reduced to five lenses in five groups.

Figure 11:
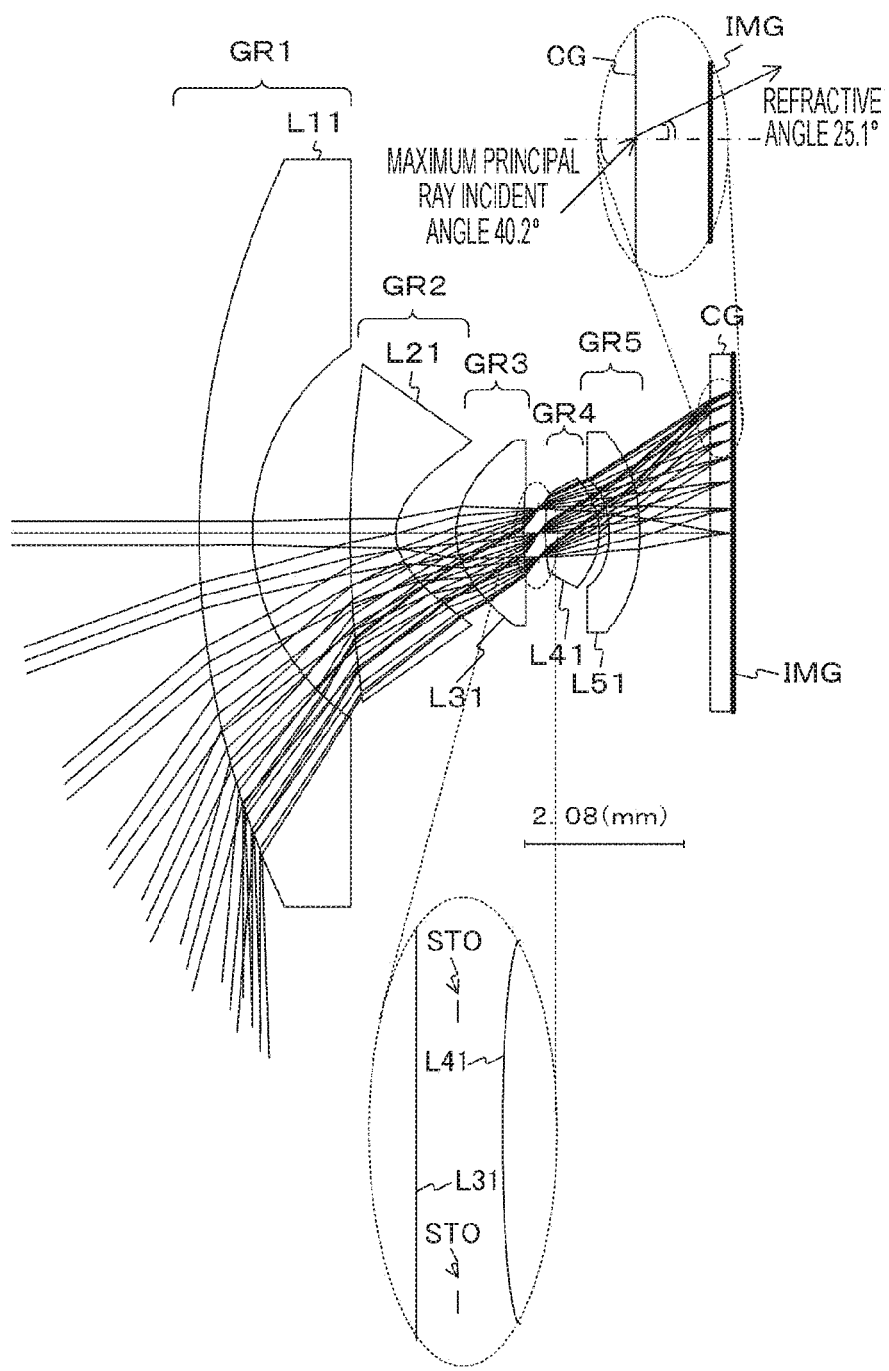
FIG. 11 is a sectional view of an exemplary configuration of an image pickup device according to a third embodiment of the present technology.

FIG. 11 is a sectional view of an exemplary configuration of the image pickup device 110 according to the third embodiment of the present technology. The image pickup device 110 according to the third embodiment is different from that according to the first embodiment in that an image pickup lens includes the five lenses in the five groups. The image pickup lens includes a first lens group GR1, a second lens group GR2, a third lens group GR3, a diaphragm STO, a fourth lens group GR4, and a fifth lens group GR5 arranged in sequence from the object side to the image surface side.

According to the third embodiment, for example, a ¼-inch imager having a 100-percent image height of 2.25 millimeters (mm), a pixel pitch of 2.8 micrometers (μm), and a pixel count of 1.2 mega is used as an image pickup element IMG. The image pickup lens is a horizontal fisheye lens, and is, for example, used for an in-vehicle camera (mainly, an around view camera).

The first lens group GR1 includes a lens L11. The lens L11 is a spherical negative meniscus lens having a convex face facing the object side. The second lens group GR2 includes a lens L21. The lens L21 is an aspherical negative meniscus lens having a convex face facing the object side. The third lens group GR3 includes an aspherical lens L31 having positive refractive power. The fourth lens group GR4 includes an aspherical lens L41 having positive refractive power. The fifth lens group GR5 includes a lens L51. The lens L51 is an aspherical negative meniscus lens having a convex face facing the image surface side.

Note that the lens L11 is an exemplary first lens described in the claims. In addition, the lens L21 is an exemplary second lens described in the claims, and the lens L31 is an exemplary third lens described in the claims. In addition, the lens L41 is an exemplary fourth lens described in the claims, and the lens L51 is an exemplary fifth lens described in the claims.

According to the third embodiment, a cover glass CG is also stuck on the image pickup element IMG, similarly to the first embodiment. With this arrangement, the maximum emergent angle of the image pickup lens (40.2 degrees) is relaxed to 25.1 degrees, and incidence is made on an image surface with the angle retained. As described above, since the allowable limit of the maximum incident angle to a CMOS or a CCD is approximately 35 degrees, the maximum incident angle is made not more than the allowable limit due to the relaxation so that the wide-angle image pickup lens can be applied to the image pickup device 110 including, for example, the CMOS.

In addition, as described above, in sequence from the object side, the lens L11 having strong negative refractive power, the lens L21 having strong negative refractive power, and the lens L31 having the positive refractive power are arranged and, across the diaphragm STO, the lenses L41 and L51 in a configuration in which the lenses are inverted are arranged. In this manner, with the symmetrical configuration across the diaphragm STO, asymmetrical aberration is inhibited from occurring and the incident angle to the image pickup element IMG is adjusted so that desirable image pickup characteristics can be achieved.

In addition, the half field angle of the image pickup lens is 92 degrees, and principal rays at the outermost field angle are incident on the image pickup lens at 92 degrees and are emergent from the image pickup lens at 40.2 degrees. A smaller difference between the incident angle and the emergent angle indicates that the symmetry of the lens system is higher, and the higher symmetry acts on aberration correction advantageously so that advantage easily overall accrues to an image pickup apparatus 100. The difference between 92 degrees and 40.2 degrees is regarded as large for a central-projection-typed lens not being a fisheye lens, but the image pickup lens according to the second embodiment is the fisheye lens as described above. Thus, in consideration of the fisheye lens, it can be evaluated that the difference between the incident angle and the emergent angle is small.

In this manner, with the half field angle of 92 degrees, the incident angle of 25.1 degrees to the image pickup element, and an F-number of 2.8 being bright, the image pickup apparatus 100 having high resolution as indicated in MTF curves to be described later can be achieved. Particularly, for the field angle, the half field angle is 55 degrees according to the first embodiment, whereas the half field angle of 92 degrees is acquired according to the third embodiment. Thus the image of an area wider than that according to the first embodiment can be picked up. In addition, the optical entire length is 7.0 millimeters (mm) and is excessively shorter than those of the other configurations having similar performance.

In addition, the aspherical faces of the lenses used according to the third embodiment are defined by an expression similar to that according to the second embodiment.

[Components of Image Pickup Device]

The following Table 4 illustrates lens data of the image pickup device 110 according to the third embodiment.

TABLE 4

| Face number | Radius of curvature R (mm) | Interval d (mm) | Refractive index nd | Abbe's number vd |
|---|---|---|---|---|
| 1 | 11.13 | 0.700 | 1.62 | 63.9 |
| 2 | 2.89 | 1.283 | — | — |
| 3 | 13.12 | 0.600 | 1.53 | 56.0 |
| 4 | 0.64 | 0.789 | — | — |
| 5 | 0.97 | 0.874 | 1.63 | 23.9 |
| 6 | 8.33 | 0.206 | — | — |
| 7 | ∞ | 0.084 | — | — |
| 8 | 2.51 | 0.708 | 1.53 | 56.0 |
| 9 | −0.85 | 0.135 | — | — |
| 10 | −1.27 | 0.400 | 1.63 | 23.9 |
| 11 | −2.88 | 0.921 | — | — |
| 12 | ∞ | 0.300 | 1.52 | 64.2 |
| 13 | ∞ | 0.000 | 1.52 | 64.2 |

In Table 4, face numbers 1 and 2 represent the faces on the object side and image surface side of the lens L11. Face numbers 3 and 4 represent the faces on the object side and image surface side of the lens L21. Face numbers 5 and 6 represent the faces on the object side and image surface side of the lens L31. Face number 7 represents a face of the diaphragm STO. Face numbers 8 and 9 represent the faces on the object side and image surface side of the lens L41. Face numbers 10 and 11 represent the faces on the object side and image surface side of the lens L51. Face numbers 12 and 13 represent the faces on the object side and image surface side of the cover glass CG.

The faces of face numbers 3 to 6 and the faces of face numbers 8 to 11 described above each include an aspherical face. Table 5 exemplifies aspherical face data of the faces.

TABLE 5

| Face number | Conic constant K | Aspherical coefficient A | Aspherical coefficient B | Aspherical coefficient C | Aspherical coefficient D |
|---|---|---|---|---|---|
| 3 | −1.000 | −0.100E−02 | 0.100E−04 | 0.000E+00 | 0.000E+00 |
| 4 | −0.901 | −0.969E−01 | 0.100E−01 | −0.545E−02 | −0.100E−01 |
| 5 | −1.000 | −0.100E−01 | −0.182E−02 | 0.100E−01 | −0.135E−02 |
| 6 | 1.000 | 0.100E+00 | 0.100E+00 | 0.100E−01 | 0.100E−01 |
| 8 | −1.000 | −0.100E−01 | 0.100E−01 | 0.100E−01 | 0.100E−01 |
| 9 | −1.000 | 0.100E+00 | −0.497E−01 | −0.583E−01 | −0.960E−01 |
| 10 | −1.000 | 0.100E+00 | −0.100E+00 | −0.100E+00 | −0.100E+00 |
| 11 | 0.689 | −0.305E−01 | −0.621E−01 | 0.638E−01 | −0.184E−01 |

On the basis of the data exemplified in Tables 4 and 5, the image pickup lens having a numerical aperture of 2.8, the half field angle of 92.0 degrees, and an entire lens length of 7.0 millimeters (mm) in the optical axis direction is formed.

[Aberration of Image Pickup Lens]

Figure 12A:
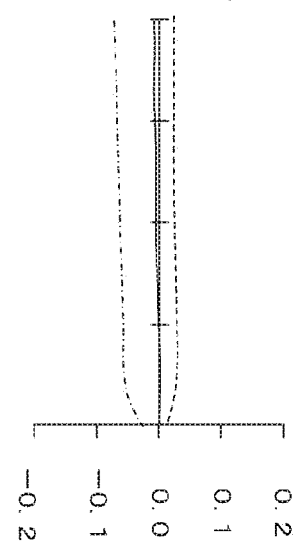
FIGS. 12a, 12b, and 12c illustrate various aberration diagrams according to the third embodiment of the present technology.
Figure 12B:
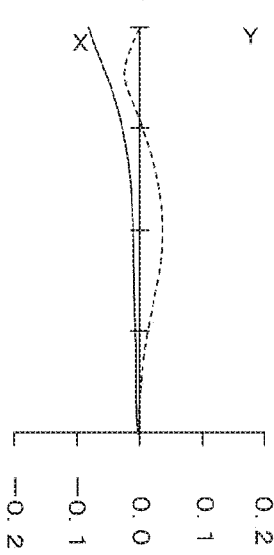
Figure 12C:
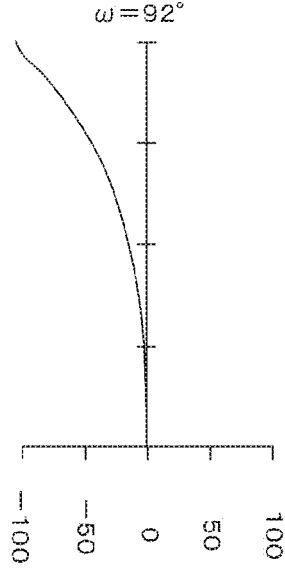
Figure 13:
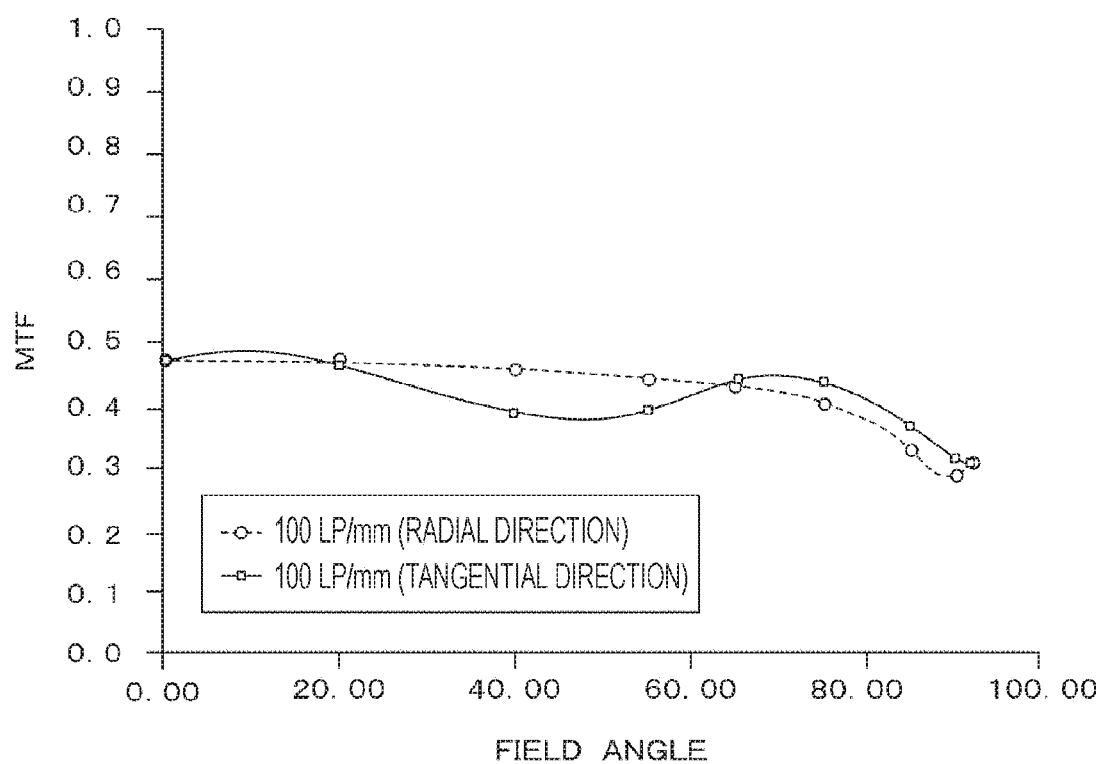
FIG. 13 is a graph illustrating exemplary MTF curves according to the third embodiment of the present technology.

FIGS. 12a, 12b, and 12c illustrate various aberration diagrams of the image pickup lens according to the second embodiment of the present technology, and FIG. 13 is a graph illustrating exemplary MTF curves according to the second embodiment. In FIG. 13, a curve including the plots of circles represents the MTF curve in the radial direction, and a curve including the plots of squares represents the MTF curve in the tangential direction. As exemplified in FIG. 13, high resolution, in which the MTF characteristic is 40% or more, is acquired in each of the MTF curves in 100 LP/mm.

In this manner, according to the third embodiment of the present technology, the fisheye lens including the five lenses in the five groups is provided, so that the image pickup device 110 can be reduced in size with the field angle expanded in comparison to that including the eight lenses in the four groups according to the first embodiment.

4. Fourth Embodiment

According to the first embodiment described above, the image pickup lens including the eight lenses in the four groups is provided, but the number of lenses can be reduced in order to perform miniaturization. An image pickup device 110 according to a fourth embodiment is different from that according to the first embodiment in that the number of lenses is reduced to five lenses in five groups.

Figure 14:
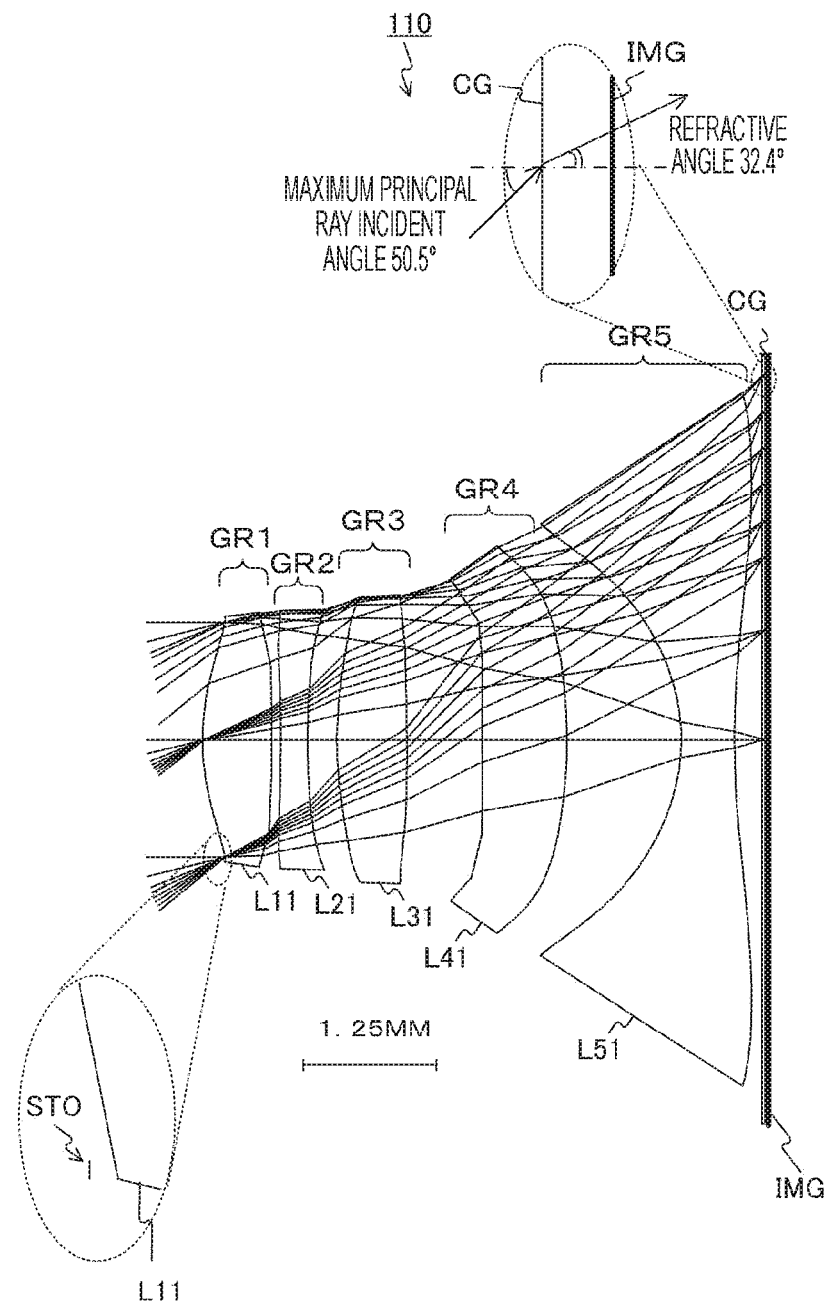
FIG. 14 is a sectional view of an exemplary configuration of an image pickup device according to a fourth embodiment of the present technology.

FIG. 14 is a sectional view of an exemplary configuration of the image pickup device 110 according to the fourth embodiment of the present technology. The image pickup device 110 according to the fourth embodiment is different from that according to the first embodiment in that an image pickup lens includes the five lenses in the five groups. The image pickup lens according to the fourth embodiment, includes a diaphragm STO, a first lens group GR1, a second lens group GR2, a fourth lens group GR4, and a fifth lens group GR5 arranged in sequence from the object side to the image surface side.

According to the fourth embodiment, for example, a 1/2.6-inch CMOS imager having a pixel pitch of 0.9 micrometers (μm) and a pixel count of 24 mega is used as an image pickup element IMG.

The first lens group GR1 includes a lens L11 having positive refractive power, the lens L11 having a convex face facing the object side. The second lens group GR2 includes a lens L21 having negative refractive power, the lens L21 having concave faces on both of the object side and the image surface side. The third lens group GR3 includes a lens L31 having positive refractive power, the lens L31 having convex faces on both of the object side and the image surface side. Note that the lens L11 is an exemplary first lens described in the claims. In addition, the lens L21 is an exemplary second lens described in the claims, and the lens L31 is an exemplary third lens described in the claims.

A lens group having a positive-negative-positive triplet configuration includes the lenses L11, L21, and L31. The triplet configuration has been well known in that aberration can be corrected well but the field angle cannot be expanded with this configuration alone. Therefore, the fourth lens group GR4 and the fifth lens group GR5 are required.

The fourth lens group GR4 includes a lens L41 having a convex shape in a paraxial region not more than a predetermined paraxial radius of curvature on each of both faces. Note that the regions except the paraxial regions of the lens L41 are concave. Note that the lens L41 is an exemplary fourth lens described in the claims.

The fifth lens group GR5 includes a lens L51 having considerably strong negative refractive power, the lens L51 having a concave face facing the object side. The refractive power of the lens L51 is, for example, stronger than those of the other lenses. The lens 51 having the negative refractive power considerably strong can correct image surface curvature greatly so that the bright wide-angle image pickup lens can be achieved. Note that the lens 51 is an exemplary fifth lens described in the claims.

In addition, due to the convex paraxial regions of the lens L41, the aberration can be adjusted to reduce for rays from the third lens group GR3 to the fifth lens group GR5. In addition, higher-order aberration can be effectively used due to the concave regions out of the paraxial regions so that the aberration can be overall corrected well.

At the position of 100-percent image height, the exit angle of principal rays from the image pickup lens described above is 46.5 degrees. The rays are refracted at a cover lens CG so as to bend at 30.3 degrees. Note that, at the position of 90-percent image height, the principal ray exit angle is 50.5 degrees and the refractive angle is 32.4 degrees. The principal rays have the largest incident angle at this position, and the principal ray incident angle lessens (namely, reduces) as closer to the center image height from the 90-percent image height.

With the 1/2.6-inch imager having the pixel count of 24 mega, described above, the bright lens having an F-number of 1.89 can achieve a wide angle having an half field angle of 39 degrees with the optical entire length retained to 5.3 millimeters (mm). In addition, an image pickup apparatus 100 having high resolution of high resolution as indicated in MTF curves, to be described later, can be achieved.

In addition, some lenses in the lenses used according to the fourth embodiment have a lens face including an aspherical face, as described above. The distance from the tangential plane of the vertex of an aspherical face at coordinate points of the aspherical face at a height of "y" from the optical axis, the distance being referred to as "x", is expressed by the following expression.

[Mathematical Formula 2]

$$x = \frac{cy^2}{1 + \sqrt{1 - (1+k)c^2 y^2}} + u^4 \sum_{m=0}^{13} a_m Q_m^{con}(u^2)$$

In the above expression, $r_n$ represents the normalized radius and u represents "$y/r_n$". $a_m$ represents the m-th $Q^{com}$ coefficient and $Q^{com}_m$ represents the m-th $Q^{com}$ polynomial expression.

[Components of Image Pickup Device]

The following Table 6 illustrates lens data of the image pickup device 110 according to the fourth embodiment.

TABLE 6

| Face number | Radius of curvature R (mm) | Interval d (mm) | Refractive index nd | Abbe's number vd |
|---|---|---|---|---|
| 1 | 2.33 | 0.650 | 1.51 | 56.0 |
| 2 | 51.24 | 0.086 | — | — |
| 3 | −14.48 | 0.250 | 1.64 | 23.0 |
| 4 | 7.47 | 0.277 | — | — |
| 5 | 3.42 | 0.660 | 1.50 | 81.6 |
| 6 | −297.55 | 0.710 | — | — |
| 7 | 18.01 | 0.796 | 1.51 | 56.0 |
| 8 | −4.87 | 1.082 | — | — |
| 9 | −1.86 | 0.500 | 1.51 | 56.0 |
| 10 | 7.82 | 0.262 | — | — |
| 11 | ∞ | 0.025 | 1.50 | 81.6 |
| 12 | ∞ | 0.000 | 1.50 | 81.6 |

In Table 6, face number 1 represents a face of the diaphragm STO. Face numbers 2 and 3 represent the faces on the object side and image surface side of the lens L11. Face numbers 4 and 5 represent the faces on the object side and image surface side of the lens L21. Face numbers 6 and 7 represent the faces on the object side and image surface side of the lens L31. Face numbers 8 and 9 represent the faces on the object side and image surface side of the lens L41. Face numbers 10 and 11 represent the faces on the object side and image surface side of the lens L51. Face number 12 represents the face on the object side of the cover glass CG.

The faces of face numbers 1 to 10 described above, each include an aspherical face. Table 7 exemplifies aspherical face data of the faces.

Note that coefficients QC4, QC6, QC8, QC10, QC12, and QC14 represent the fourth, sixth, eighth, tenth, twelfth, and fourteenth $Q^{com}$ coefficients, respectively.

On the basis of the data exemplified in Tables 6 and 7, the image pickup lens having a numerical aperture of 1.89, the half field angle of 39.0 degrees, and an entire lens length of 5.3 millimeters (mm) in the optical axis direction is formed.

[Aberration of Image Pickup Lens]

Figure 15A:
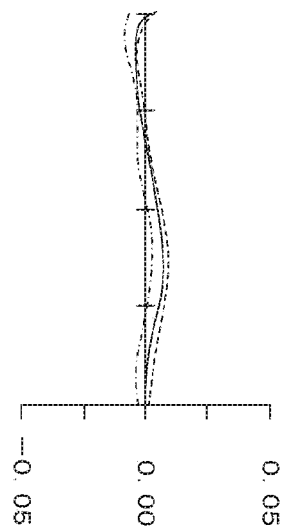
FIGS. 15a, 15b, and 15c illustrate various aberration diagrams according to the fourth embodiment of the present technology.
Figure 15B:
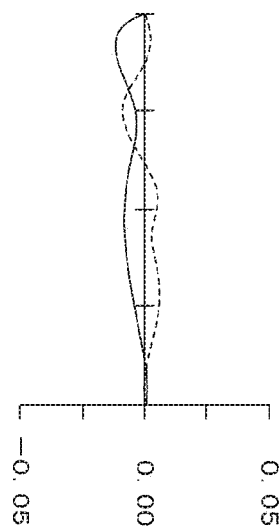
Figure 15C:
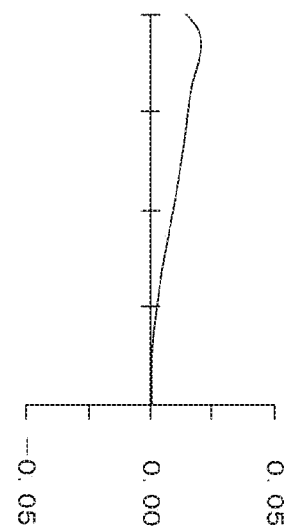
Figure 16:
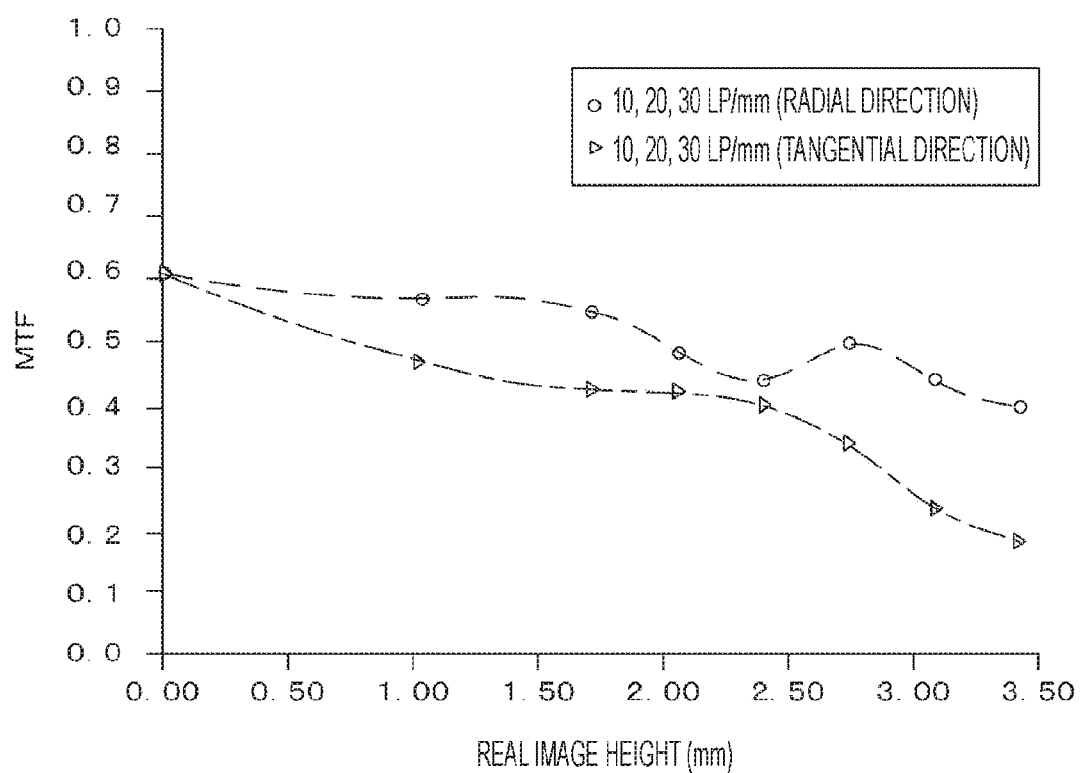
FIG. 16 is a graph illustrating exemplary MTF curves according to the fourth embodiment of the present technology.

FIGS. 15*a*, 15*b*, and 15*c* illustrate various aberration diagrams of the image pickup lens according to the fourth embodiment of the present technology, and FIG. 16 is a graph illustrating exemplary MTF curves according to the fourth embodiment. In FIG. 16, a curve including the plots of circles represents the MTF curve in the radial direction, and a curve including the plots of triangles represents the MTF curve in the tangential direction. The MTF curves each are a curve of white light at the half frequency (278 LP/mm) of the Nyquist frequency of the pixel pitch of 0.9 micrometers (μm). In the MTF curves, an MTF characteristic of 60.0% on the axis, an MTF characteristic of 39.6% in the radial direction and an MTF characteristic of 43.5% in the tangential direction at 70-percent image height can be achieved.

In this manner, according to the fourth embodiment of the present technology, the image pickup lens including the five lenses in the five groups is provided, so that the image pickup device 110 can be further reduced in size in comparison to that including the eight lenses in the four groups according to the first embodiment.

5. Fifth Embodiment

According to the first embodiment described above, the image pickup lens including the eight lenses in the four groups is provided, but the number of lenses can be reduced in order to perform miniaturization. An image pickup device 110 according to a fifth embodiment is different from that according to the first embodiment in that the number of lenses is reduced to five lenses in five groups.

Figure 17:
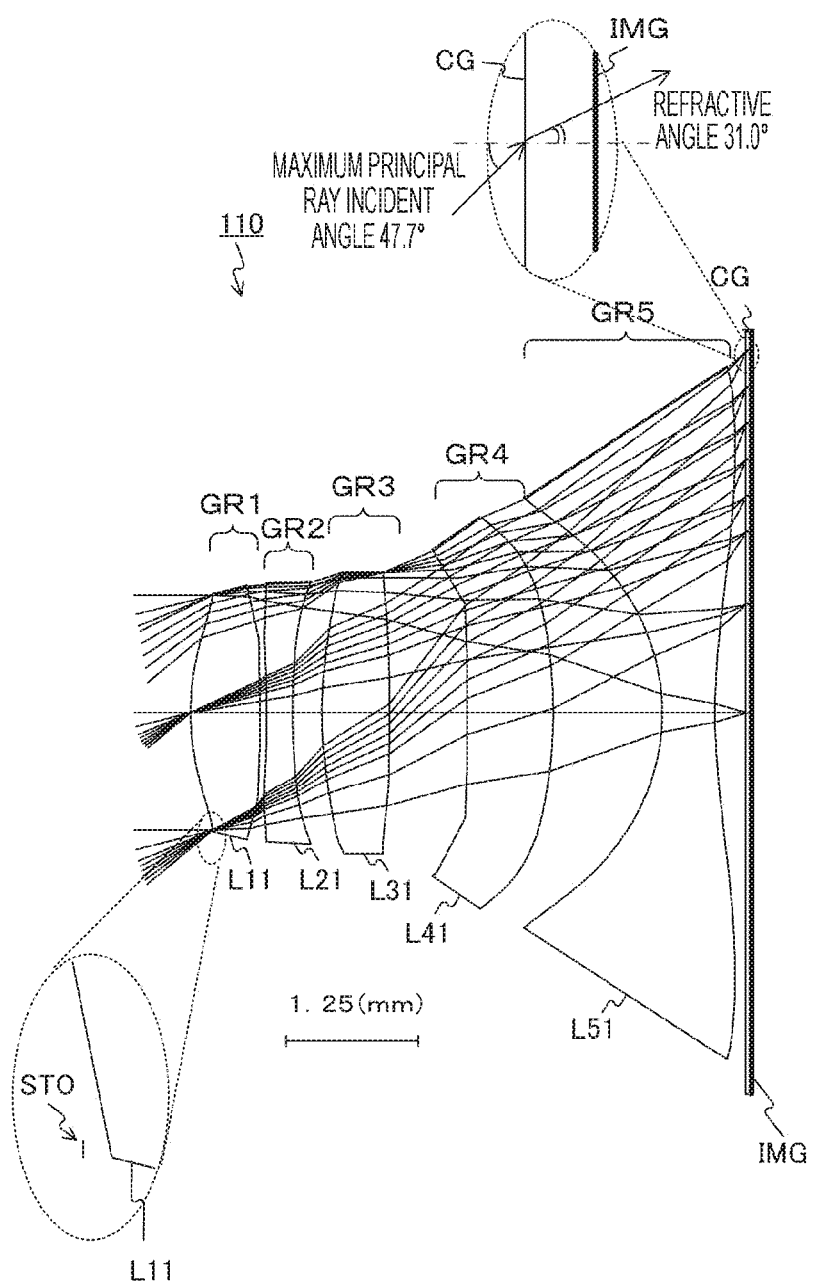
FIG. 17 is a sectional view of an exemplary configuration of an image pickup device according to a fifth embodiment of the present technology.

FIG. 17 is a sectional view of an exemplary configuration of the image pickup device 110 according to the fifth embodiment of the present technology. The image pickup device 110 according to the fifth embodiment is different from that according to the first embodiment in that an image pickup lens includes the five lenses in the five groups. The image pickup lens according to the fifth embodiment, includes a diaphragm STO, a first lens group GR1, a second lens group GR2, a third lens group GR3, a fourth lens group GR4, and a fifth lens group GR5 arranged in sequence from the object side to the image surface side. The configurations of the lenses are similar to those according to the fourth embodiment except for lens data and aspherical face data.

TABLE 7

| Face number | Conic constant K | Normalized radius $r_n$ | Coefficient QC4 | Coefficient QC6 | Coefficient QC8 | Coefficient QC10 | Coefficient QC12 | Coefficient QC14 |
|---|---|---|---|---|---|---|---|---|
| 1 | −8.881E−01 | 1.100E+00 | −4.397E−02 | −9.322E−03 | −1.202E−03 | −4.145E−05 | 1.920E−05 | 2.696E−06 |
| 2 | −9.949E−01 | 1.090E+00 | −8.636E−02 | −2.202E−03 | −2.231E−04 | 2.591E−04 | −1.156E−04 | 5.247E−06 |
| 3 | 1.000E+00 | 1.119E+00 | 1.720E−02 | 9.976E−03 | −1.076E−03 | 5.004E−04 | −2.721E−04 | 2.521E−05 |
| 4 | 1.000E+00 | 1.139E+00 | 3.109E−02 | 1.112E−02 | −2.186E−03 | 3.488E−04 | −2.042E−04 | 7.095E−06 |
| 5 | 3.732E−01 | 1.273E+00 | −8.186E−02 | 2.020E−02 | 1.850E−03 | 5.857E−04 | −1.671E−04 | −2.134E−05 |
| 6 | 1.000E+00 | 1.428E+00 | −7.447E−02 | 3.718E−02 | 1.659E−02 | 5.376E−03 | 1.281E−03 | 2.483E−04 |
| 7 | −9.980E−01 | 1.738E+00 | −6.776E−01 | −1.084E−01 | 5.739E−03 | 1.394E−02 | 5.212E−03 | 1.186E−03 |
| 8 | 1.000E+00 | 1.933E+00 | −3.547E−01 | −7.373E−02 | 1.895E−02 | 1.256E−02 | 3.128E−03 | 8.398E−04 |
| 9 | −6.001E−01 | 2.183E+00 | −5.976E−02 | 6.257E−02 | 5.616E−02 | 1.060E−02 | −2.819E−03 | −9.971E−04 |
| 10 | 4.279E−01 | 3.273E+00 | −6.866E−01 | 3.555E−02 | −9.305E−03 | −4.421E−03 | −1.736E−03 | −3.497E−04 |

According to the fifth embodiment, for example, a 1/2.6-inch CMOS imager having a pixel pitch of 0.9 micrometers (μm) and a pixel count of 24 mega is used as an image pickup element IMG. In addition, the image pickup device 110 according to the fifth embodiment is, for example, used for a smartphone or the like.

With the 1/2.6-inch imager having the pixel count of 24 mega, described above, the bright lens having an F-number of 1.89 can achieve a wide angle having a half field angle of 39 degrees with the optical entire length retained to 5.3 millimeters (mm). In addition, an image pickup apparatus 100 having high resolution as indicated in MTF curves, to be described later, can be achieved.

In addition, the aspherical faces of the lenses used according to the fifth embodiment are defined by an expression similar to that according to the fourth embodiment.

[Components of Image Pickup Device]

The following Table 8 illustrates lens data of the image pickup device 110 according to the fifth embodiment.

TABLE 8

| Face number | Radius of curvature R (mm) | Interval d (mm) | Refractive index nd | Abbe's number vd |
|---|---|---|---|---|
| 1 | 2.33 | 0.660 | 1.51 | 56.0 |
| 2 | 51.39 | 0.060 | — | — |
| 3 | −28.59 | 0.250 | 1.64 | 23.0 |
| 4 | 6.15 | 0.275 | — | — |
| 5 | 3.56 | 0.649 | 1.50 | 81.6 |
| 6 | −70.71 | 0.737 | — | — |
| 7 | 41.64 | 0.815 | 1.59 | 61.3 |
| 8 | −4.67 | 1.041 | — | — |
| 9 | −2.02 | 0.500 | 1.51 | 56.0 |
| 10 | 5.90 | 0.288 | — | — |
| 11 | ∞ | 0.025 | 1.50 | 81.6 |
| 12 | ∞ | 0.000 | 1.50 | 81.6 |

In the image pickup lens with the lens data described above, the emergent angle of the image pickup lens, being 47.7 degrees at a maximum at 100-percent image height, is relaxed to 33.1 degrees due to refraction at the surface of a cover glass CG.

The faces of face numbers 1 to 10 described above, each include an aspherical face. Table 9 exemplifies aspherical face data of the faces.

TABLE 9

| Face number | Conic constant K | Normalized radius $r_n$ | Coefficient QC4 | Coefficient QC6 | Coefficient QC8 | Coefficient QC10 | Coefficient QC12 | Coefficient QC14 |
|---|---|---|---|---|---|---|---|---|
| 1 | −6.579E−01 | 1.100E+00 | −4.494E−02 | −9.002E−03 | −1.194E−03 | −5.551E−05 | 1.607E−05 | 2.479E−06 |
| 2 | 1.000E+00 | 1.090E+00 | −9.002E−02 | −4.101E−04 | −7.219E−04 | 3.444E−04 | −1.463E−04 | 1.260E−05 |
| 3 | 1.000E+00 | 1.105E+00 | −1.091E−03 | 1.081E−02 | −1464E−03 | 5.756E−04 | −2.654E−04 | 2.624E−05 |
| 4 | −1.000E+00 | 1.107E+00 | 1.607E−02 | 9.488E−03 | −1.708E−03 | 3.341E−04 | −1.470E−04 | 4.198E−06 |
| 5 | 1.000E+00 | 1.207E+00 | −7.182E−02 | 1.202E−02 | 1.270E−03 | 4.476E−04 | −6.194E−05 | −1.714E−05 |
| 6 | −1.000E+00 | 1.340E+00 | −6.732E−02 | 1.359E−02 | 6.852E−03 | 2.107E−03 | 4.696E−04 | 1.092E−04 |
| 7 | 1.000E+00 | 1.684E+00 | −5.010E−01 | −9.376E−02 | −5.072E−03 | 6.248E−03 | 2.735E−03 | 7.487E−04 |
| 8 | 1.000E+00 | 1.893E+00 | −2.692E−01 | −6.925E−02 | 6.088E−03 | 6.362E−03 | 1.513E−03 | 4.628E−04 |
| 9 | −5.160E−01 | 2.130E+00 | −1.722E−01 | 4.776E−02 | 3.472E−02 | 1.020E−02 | −1.362E−03 | −1.051E−03 |
| 10 | −4.443E−02 | 3.290E+00 | −9.581E−01 | 9.366E−02 | −2.557E−02 | 1.169E−03 | −3.004E−03 | −2.698E−04 |

On the basis of the data exemplified in Tables 8 and 9, the image pickup lens having a numerical aperture of 1.85, a half field angle of 39.3 degrees, and an entire lens length of 5.3 millimeters (mm) in the optical axis direction is formed.

[Aberration of Image Pickup Lens]

Figure 18A:
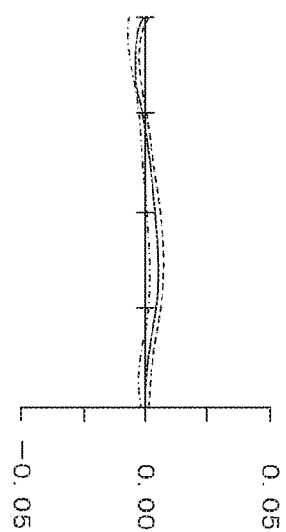
FIGS. 18a, 18b, and 18c illustrate various aberration diagrams according to the fifth embodiment of the present technology.
Figure 18B:
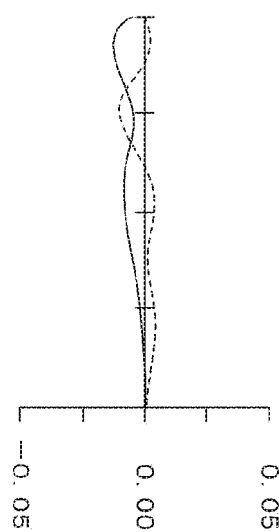
Figure 18C:
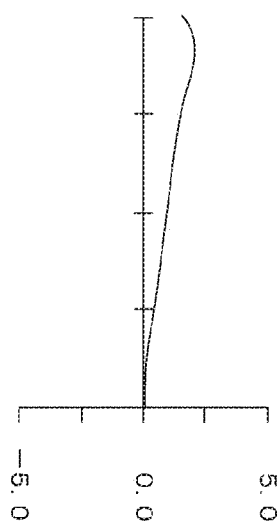
Figure 19:
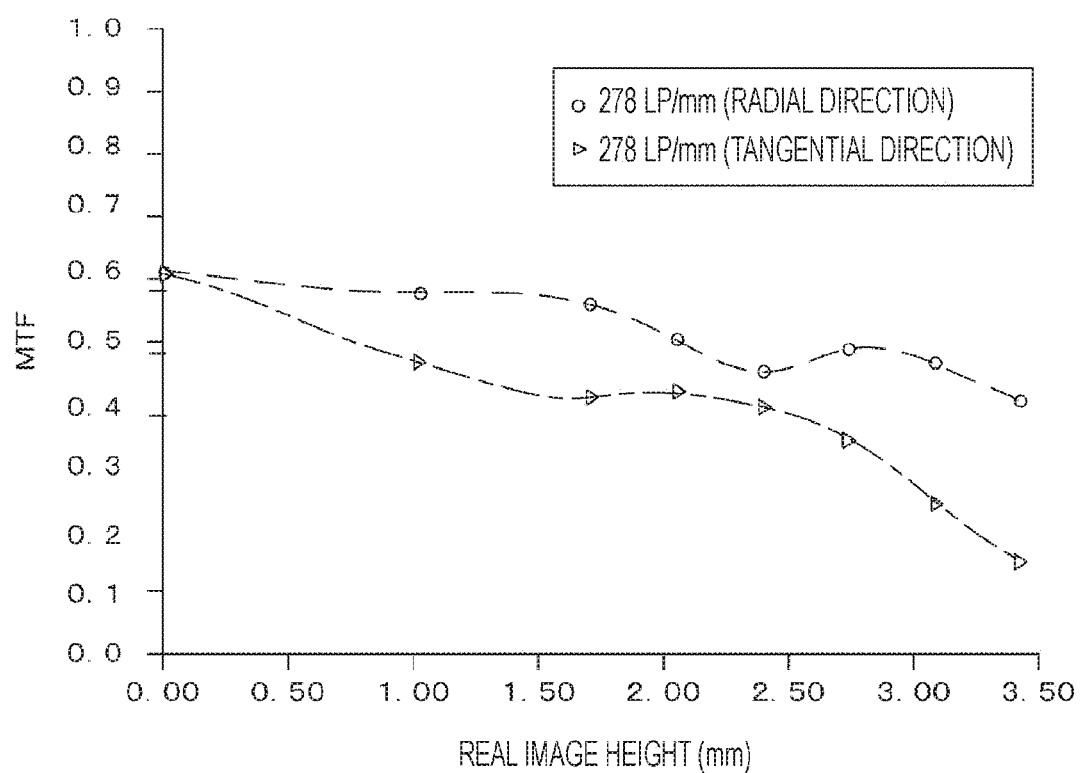
FIG. 19 is a graph illustrating exemplary MTF curves according to the fifth embodiment of the present technology.

FIGS. 18a, 18b, and 18c illustrate various aberration diagrams of the image pickup lens according to the fifth embodiment of the present technology, and FIG. 19 is a graph illustrating exemplary MTF curves according to the fifth embodiment. In FIG. 19, a curve including the plots of circles represents the MTF curve in the radial direction, and a curve including the plots of triangles represents the MTF curve in the tangential direction. The MTF curves each are a curve of white light at the half frequency (278 LP/mm) of the Nyquist frequency of the pixel pitch of 0.9 micrometers (μm). In the MTF curves, an MTF characteristic of 61.4% on the axis, an MTF characteristic of 39.3% in the radial direction and an MTF characteristic of 45.4% in the tangential direction at 70-percent image height can be achieved.

In this manner, according to the fifth embodiment of the present technology, the image pickup lens including the five lenses in the five groups is provided, so that the image pickup device 110 can be further reduced in size in comparison to that including the eight lenses in the four groups according to the first embodiment.

Note that the embodiments described above are exemplified in order to embody the present technology, and the matters in the embodiments and particular matters concerning the invention in the claims are in correspondence relationship with each other. Similarly, the particular matters concerning the invention in the claims correspond to the matters in the embodiments of the present technology referred to as the same names as those of the particular matters. Note that the present technology is not limited to the embodiments, and thus various modifications are made to the embodiments without departing from the scope of the spirit so that the present technology can be embodied.

Note that, the effects described here are not necessarily limited, and any of the effects described in the present disclosure may be provided.

Note that the present technology can also have the following configurations.

(1) An image pickup device including:
an image pickup lens; an image pickup element; and
a cover glass stuck on the image pickup element without containing air therebetween,
in which a maximum incident angle of principal rays from the image pickup lens to the cover glass is larger than 35 degrees, and
a refractive angle of the cover glass is at least five degrees smaller than the maximum incident angle.

(2) The image pickup device described in (1) above, in which
the image pickup lens includes a first lens, a second lens, a diaphragm, a third lens, and a fourth lens arranged in sequence from an object side to an image surface side,
the first lens is a spherical negative meniscus lens having a convex face facing the object side,
the second lens is an aspherical lens having positive refractive power,
the third lens is an aspherical lens having positive refractive power, the aspherical lens having convex faces on both of the object side and the image surface side, and the fourth lens is a spherical negative meniscus lens having a convex face facing the image surface side.

(3) The image pickup device described in (1) above, in which
the image pickup lens includes a first lens, a second lens, a third lens, a diaphragm, a fourth lens, and a fifth lens arranged in sequence from an object side to an image surface side,
the first lens is a spherical negative meniscus lens having a convex face facing the object side,
the second lens is an aspherical negative meniscus lens having a convex face facing the object side,
each of the third lens and the fourth lens is an aspherical lens having positive refractive power, and
the fifth lens is an aspherical negative meniscus lens having a convex face facing the image surface side.

(4) The image pickup device described in (1) above, in which
the image pickup lens includes a diaphragm, a first lens, a second lens, a third lens, a fourth lens, and a fifth lens arranged in sequence from an object side to an image surface side,
the first lens is a lens having positive refractive power, the first lens having a convex face facing the object side,
the second lens has negative refractive power,
the third lens has positive refractive power,
the fourth lens is a lens having positive refractive power, the fourth lens having an aspherical face on the image surface side and having the positive refractive power stronger as deviating from an optical axis, and
the fifth lens is a lens having negative refractive power, the fifth lens having a concave face facing the object side.

(5) The image pickup device described in (4) above in which, both of the object side and the image surface side of the second lens are concave.

(6) The image pickup device described in (4) or (5) above in which, both of the object side and the image surface side of the third lens are convex.

(7) The image pickup device described in any of (4) to (6) above in which, a paraxial region less than a predetermined paraxial radius of curvature on each of both faces of the fourth lens is convex.

(8) The image pickup device described in any of (1) to (7) above in which, an Abbe's number of the cover glass is at least 55, and a thickness of the cover glass is not more than 0.3 millimeters.

(9) The image pickup device described in any of (1) to (8) above in which, a back focus being a distance from the cover glass to the image pickup lens is not more than 0.2 millimeters.

(10) The image pickup device described in any of (1) to (9) above in which, the image pickup lens further includes a lens having substantially no lens power.

(11) An image pickup apparatus including:
an image pickup device including an image pickup lens, an image pickup element, and a cover glass stuck on the image pickup element without containing air therebetween; and
a signal processing unit configured to process an image signal generated by the image pickup element, in which
a maximum incident angle of principal rays from the image pickup lens, to the cover glass is larger than 35 degrees, and
a refractive angle of the cover glass is at least five degrees smaller than the maximum incident angle.

REFERENCE SINGS LIST

100 Image pickup apparatus
110 Image pickup device

120 Signal processing unit
130 Recording unit
150 Control unit

The invention claimed is:

1. An image pickup device, comprising:
an image pickup lens;
an image pickup element; and
a cover glass between the image pickup element and the image pickup lens, wherein the cover glass is adhered to the image pickup element such that air is excluded between the cover glass and the image pickup element, wherein
a half field angle of the image pickup lens is one of 39 degrees, 63 degrees, or 92 degrees,
a maximum incident angle of principal rays from the image pickup lens to the cover glass is larger than 35 degrees, and
a refractive angle of the cover glass is at least five degrees smaller than the maximum incident angle of the principal rays.

2. The image pickup device according to claim 1, wherein
the image pickup lens includes a first lens, a second lens, a diaphragm, a third lens, and a fourth lens arranged in sequence from an object side to an image surface side,
each of the first lens and the fourth lens is a spherical negative meniscus lens,
the first lens has a first convex face that faces the object side,
each of the second lens and the third lens is an aspherical lens having positive refractive power,
the aspherical lens having convex faces on the object side and the image surface side, and
the fourth lens has a second convex face that faces the image surface side.

3. The image pickup device according to claim 1, wherein
the image pickup lens includes a first lens, a second lens, a third lens, a diaphragm, a fourth lens, and a fifth lens arranged in sequence from an object side to an image surface side,
the first lens is a spherical negative meniscus lens,
the first lens has a first convex face that faces the object side,
each of the second lens and the fifth lens is an aspherical negative meniscus lens,
the second lens has a second convex face that faces the object side,
each of the third lens and the fourth lens is an aspherical lens having positive refractive power, and
the fifth lens has a third convex face that faces the image surface side.

4. The image pickup device according to claim 1, wherein
the image pickup lens includes a diaphragm, a first lens, a second lens, a third lens, a fourth lens, and a fifth lens arranged in sequence from an object side to an image surface side,
each of the first lens, the third lens, and the fourth lens is a lens having positive refractive power,
the first lens has a convex face that faces the object side,
each of the second lens and the fifth lens has negative refractive power,
the fourth lens has an aspherical face on the image surface side,
the positive refractive power of the fourth lens becomes stronger as the fourth lens deviates from an optical axis, and
the fifth lens has a concave face that faces the object side.

5. The image pickup device according to claim 4, wherein each face of the second lens is concave.

6. The image pickup device according to claim 4, wherein each face of the third lens is convex.

7. The image pickup device according to claim 4, wherein a paraxial region less than a specific paraxial radius of curvature on each face of the fourth lens is convex.

8. The image pickup device according to claim 1, wherein
an Abbe's number of the cover glass is at least 55, and
a thickness of the cover glass is equal to or less than 0.3 millimeters.

9. The image pickup device according to claim 1, wherein
a distance from the cover glass to the image pickup lens is a back focus, and
the back focus is equal to or less than 0.2 millimeters.

10. An image pickup apparatus, comprising:
an image pickup device including:
an image pickup lens;
an image pickup element; and
a cover glass between the image pickup element and the image pickup lens, wherein the cover glass is adhered to the image pickup element such that air is excluded between the cover glass and the image pickup element; and
a signal processing unit configured to process an image signal generated by the image pickup element, wherein
a half field angle of the image pickup lens is one of 39 degrees, 63 degrees, or 92 degrees,
a maximum incident angle of principal rays from the image pickup lens to the cover glass is larger than 35 degrees, and
a refractive angle of the cover glass is at least five degrees smaller than the maximum incident angle of the principal rays.

* * * * *